United States Patent [19]

Elliott et al.

[11] Patent Number: 5,764,241

[45] Date of Patent: Jun. 9, 1998

[54] METHOD AND SYSTEM FOR MODELING AND PRESENTING INTEGRATED MEDIA WITH A DECLARATIVE MODELING LANGUAGE FOR REPRESENTING REACTIVE BEHAVIOR

[75] Inventors: Conal M. Elliott, Redmond; Todd B. Knoblock, Woodinville; Greg D. Schechter, Seattle; Salim S. AbiEzzi, Kirkland; Colin L. Campbell, Seattle; Chun-Fu Ricky Yeung, Issaquah, all of Wash.

[73] Assignee: Microsoft Corporation, Redmond, Wash.

[21] Appl. No.: 564,956

[22] Filed: Nov. 30, 1995

[51] Int. Cl.[6] .................................................. G06T 13/00
[52] U.S. Cl. ...................... 345/473; 345/433; 707/501
[58] Field of Search ................................. 395/762, 774, 395/806, 807, 119, 120, 133, 141, 173, 174, 328, 329, 330, 331, 680, 682, 683, 684; 345/121, 122, 419, 420, 433, 441, 473, 474, 328, 329, 330, 331, 302; 707/501, 513

[56] References Cited

U.S. PATENT DOCUMENTS

| | | | |
|---|---|---|---|
| 5,261,041 | 11/1993 | Susman | 395/173 |
| 5,485,600 | 1/1996 | Joseph et al. | 395/500 |
| 5,555,354 | 9/1996 | Strasnick et al. | 395/127 |
| 5,594,911 | 1/1997 | Cruz et al. | 395/800 |
| 5,596,695 | 1/1997 | Hamada et al. | 395/333 |

FOREIGN PATENT DOCUMENTS

| | | |
|---|---|---|
| 0 627 690 A2 | 12/1994 | European Pat. Off. . |
| WO 94/23361 | 10/1994 | WIPO . |
| WO 94/27234 | 11/1994 | WIPO . |

OTHER PUBLICATIONS

"On Programming and Supporting Multimedia Object Synchronization," by F. Horn and J. B. Stefani, *The Computer Journal*, vol. 36, No. 1, Jan. 1, 1993, pp. 4–18.

"Constrained–Latency Storage Access," by R. Staehli and J. Walpole, *Computer*, vol. 26, No. 3, Mar. 1, 1993, pp. 44–53.

SIGGRAPH 94 Conference Proceeding, Table of Content, Jul. 94, pp. 7–9.

Najork et al., "Obliq–3D: A High–Level, Fast–Turnaround 3D Animation System", IEEE Transactions on Visualization and Computer Graphics, vol. 1, No. 2, Jun. 1995, pp. 175–193.

Braun et al., "AniGraph–A Data Structure for Computer Animation", Computer Animation, 1995 Proceedings, Feb. 1995, pp. 126–137.

Palmer et al., "Realism: Reusable Elements for Animation using Local Integrated Simulation Models", Computer Animation, 1994 Proceedings, Sep. 1994, pp. 132–140.

Takahashi et al, "A Framework for Constructing Animation via Declarative Mapping Rules", Visual Languages, 1994 IEEE Symposium, Sep. 1994, pp. 314–322.

(List continued on next page.)

*Primary Examiner*—Joseph H. Feild
*Assistant Examiner*—Stephen Hong
*Attorney, Agent, or Firm*—Klarquist, Sparkman, Campbell, Leigh & Whinston, LLP

[57] ABSTRACT

A method and system for modeling interactive animation and other integrated media includes support for a declarative modeling language and a system for presenting media represented in a declarative language model. The modeling language enables authors to represent natural or modeled media in a compact model, and it allows for the explicit description of time varying behavior as well as reactive behavior, which occurs in response to discrete events. The system compiles or interprets the model, optimizes it, and controls the presentation of media represented in it.

25 Claims, 9 Drawing Sheets

OTHER PUBLICATIONS

Tal et al., "Visualization of Geometric Algorithm", IEEE Transactions on Visualization and Computer Graphics, vol. 1, No. 2, Jun. 1995, pp. 194–204.

Elliott, Conal, et al., *MediaFlow, a Framework for Distributed Integrated Media*, Sun Microsystems Laboratories, Mountain View, Cali., Jun. 1995, pp. 1–22.

Elliott, Conal et al., *TBAG: A High Level Framework for Interactive, Animated 3D Graphics Applications*, SunSoft, Inc., Mountain View, Cali. 1994, pp. 1–14.

Schechter, Greg, et al., *Functional 3D Graphics in C++—with an Object–Oriented, Multiple Dispatching Implementation*, SunSoft, Inc., Mountain View, Cali., 1994, pp. 1–19.

METHOD AND SYSTEM FOR MODELING AND PRESENTING INTEGRATED MEDIA WITH A DECLARATIVE MODELING LANGUAGE FOR REPRESENTING REACTIVE BEHAVIOR

TECHNICAL FIELD

The invention relates to modeling and presentation of interactive animation and integrated media such as sound, images, or graphics.

BACKGROUND

With the increasing interest in multimedia applications, there is a demand to expand the capacity of computers to support video, audio, two-dimensional (2D) and three-dimensional (3D) graphics, and animation. Presently, it is not unusual for a moderately priced personal computer to support video, audio, and 2D graphics. A wide variety of special add-on boards have been created to expand the capability of the PC. For example, a graphics accelerator can be connected to a PC to boost the PC's ability to support 3D graphics rendering. A sound card can be added to provide high quality, stereo output. A variety of input devices have also been developed to enhance the manner in which users interact with the computer system. For example, a variety of gestural input devices have been developed such as joysticks, data gloves, and head trackers, to name a few.

While computers are now capable of providing output using a variety of media types, the difficulty is integrating media types to produce more realistic and interactive effects. The central problem is the creation of applications that effectively integrate different media types including both natural and modeled media. Natural media refers to recorded or live media such as audio or video data streams. Modeled media refers to media that is generated from computer based models such as 2D and 3D graphics and animation.

A number of critical design issues arise in developing application and system software to gracefully present integrated media to the user. The difficulty stems from the fact that input and output is traditionally handled in separate subsystems. For instance, audio, video, geometry rendering, and gestural input is typically handled using disparate hardware devices as well as separate low level programming interfaces. These disparate subsystems present difficult obstacles to implementing applications using integrated media types. Important design issues include regulation of computer resources, synchronization of media streams, and reducing latency from user input to output.

Regulation generally refers to the management of system resources in an efficient manner when performing a task or a series of tasks. An example will help illustrate the concept. Consider an application where a 3D animation is to be displayed and an accompanying audio file is to be played along with the animation. In producing the desired effect, the computer uses its available resources such as its local memory, its processor, a display controller, and a sound card. At some level, whether it is at the application program level or at the system level, the computer should be programmed to use its resources as efficiently as possible to achieve the highest quality output. Regulation is particularly important where resources are scarce and where available resources are changing. In a multi-tasking environment, for example, processor availability varies with the number of concurrently executing tasks. In these cases, the computer must utilize scarce resources more efficiently so that the user does not perceive a significant decline in the quality of the output.

Regulation is also important to achieve graceful presentation across a variety of platforms. Systems supporting interactive animation and integrated media should adapt to different platforms to exploit additional computing power where available and to maintain quality even when such resources are not available.

Synchronization refers to how the computer coordinates the timing of different media streams. Synchronization problems arise when attempting to integrate different media types because each media type is handled independently at the system software and hardware levels. At the hardware level for example, each media type is typically controlled by a separate peripheral with its own clock. At the software level, each media type has its own programming interface, which typically does not integrate media types. Thus, it is very difficult to synchronize different media streams. To the user, the lack of synchronization results in strange effects such as an animation stopping a few seconds before the audio intended to accompany it also stops.

In the context of multimedia and interactive animation, latency refers to the delay between an input from the user and the output of media streams in response to that input. To produce realistic and truly interactive output, the computer must process inputs as quickly as possible and create the desired output in a smooth and continuous fashion. For example in a game where a user attempts to shoot an enemy spaceship, the user should experience a nearly simultaneous and continuous response from the display and audio speakers so that no delay is perceived between pressing the trigger and seeing and hearing a response.

Regulation, synchronization and latency issues impact the user, the application developer, and the system developer. From the user's perspective, the failure of the computer to adequately address these issues results in poorly integrated output.

From the application developer's perspective, there is a lack of programming interfaces or modeling languages that assist him or her in developing applications with integrated media types. The application developer usually has to deal with a number of disparate media subsystems each controlling a separate media type.

As a result, the application developer has to write code that addresses regulation, synchronization and latency. This is difficult or even impossible for programmers to achieve. Application programs that attempt to perform regulation and synchronization tend to be long and complex. The difficulty in creating applications with integrated media also precludes many authors and artists from creating realistic animation and graphics because they do not have the programming expertise.

At the system level, system developers are confronted with the problem of providing an application interface to each of the disparate media types such as sound, 3D graphics rendering, video, etc. The system level software includes a variety of device drivers that communicate with disparate hardware devices, each supporting a separate media type. Preferably, the system should abstract the details of the underlying hardware and provide high level functions so that the programmer does not have to write code to control specific operation of the hardware.

While progress has been made in application programming interfaces for different media types, the problem of successfully integrating different media types at the system level is still an elusive goal.

Present software architectures and programming techniques do not adequately solve the problems of integrating media types. Advances have been made in developing software development tools to create interactive animation. However, most interactive animation is created using imperative programming techniques, which have a number of limitations.

In imperative programming, the programmer sets forth a sequence of operations telling the computer how to carry out a desired task. In the context of animation, this can include specifying how the computer is to generate each frame of animation. Obviously, this can be an onerous burden on the developer because it requires him or her to specify a significant amount of detail regarding how each frame is to be rendered.

As alluded to above, the graceful presentation of media on the computer is left to the application developer due to the current lack of media support. When issues such as regulation, synchronization, and low latency must be controlled in an application program written in an imperative language, the application tends to be very large and complex.

Another drawback to an imperative programming approach is that it makes analysis and optimization of application code difficult. Since the application provides more explicit detail as to how to create a desired effect, the system level software has less flexibility to determine more efficient ways to present the output using available resources of the computer.

Many existing programming environments for interactive graphics fail to provide effective and easy to use tools to represent integrated media types. One significant limitation is the failure to support a continuous time model for media types. Time is critical in interactive animation, and more generally in integrated media applications because media is inherently time varying. Instead of representing continuous behavior, an imperative program must explicitly handle generation of discrete output such as discrete frames of animation.

Another significant drawback is the failure to provide an integrated media development environment that results in a compact representation of media types. A compact representation is a programming or modeling format that enables a user to express sophisticated, realistic, and interactive media without writing a long, complex piece of code. Because of the characteristics outlined above, imperative programming tools do not produce compact representations.

Currently, efforts are underway to simplify the design issues at the application level and to provide developers and non-programmers the tools necessary to create interactive and realistic affects. One proposed solution is to use a declarative modeling approach rather than an imperative programming approach. In the declarative approach, the developer or author uses programming or modeling constructs to describe what behavior he or she wants to create. This is in contrast to imperative programming where an experienced programmer gives a specific sequence of instructions describing how the computer must produce a desired output. Aspects of a declarative approach for interactive media are described in Elliott, C., Schechter, G., Yeung, R., AbiEzzi, S., "TBAG: A High Level Framework for Interactive, Animated 3D Graphics Applications" *Siggraph '94 Conference Proceedings*, at 421–434 (Aug. 1994); and Schechter, G., Elliott, C., Yeung, R., AbiEzzi, S., "Functional 3D Graphics in C++ with an Object-Oriented, Multiple Dispatching Implementation," Proceedings of the Fourth Workshop on Eurographics Object-Oriented Graphics (EOOG '94).

TBAG proposes a solution which would enable the developer of an interactive animation to represent a continuous, and time varying behavior using abstract data types and explicit functions of time. The declarative model discussed in connection with TBAG is a significant improvement over other alternative approaches, but it has limitations. One of the limitations of the TBAG approach is that it does not support descriptions of media behaviors in terms of events.

As noted above, there is an increasing demand for an application development environment that enables programmers and even non-programmers to create integrated media applications. This demand is especially acute for applications designed for the Internet. For years, the Internet was limited to electronic mail and file transfer services. Now, the Internet is rapidly becoming a vast information and communication resource for millions of users. With the development of graphical browsers and the World Wide Web, commercial exploitation is fueling tremendous growth. Now, there is an increasing demand to support a variety of media types and to improve interactivity. Images and simple two-dimensional graphics are common-place on the Internet. However, support for animation, video and audio is still in its infancy.

The Virtual Reality Modeling Language or "VRML" is one format that is currently being pursued. Despite its name, VRML 1.0 only supports lifeless 3D models. As such, there is a need for a much more powerful language for supporting interactive animation and for integrating a variety of media types including video, audio, images, etc.

There are a number of important design issues that must be addressed to properly support interactive animation as well as other forms of media in Internet applications. The representation of media must be compact. The creation of interactive animation is more powerful and easier to use if it can be expressed in a compact form. A compact representation also consumes less memory and is easier to transfer over the Internet.

Security is also a major concern for Internet applications. The representation of media, therefore, must not be in a form that compromises the security of computers accessing the representation of interactive animation or other integrated media from the Internet. If an interactive animation is described using an imperative program, the security of the computer receiving an executable version of the program can be adversely impacted.

The representation of media and interactive animation must be platform independent. In other words, the support for integrated media must be available to users on a wide variety of hardware platforms.

As introduced above, the graceful presentation of media is critical. This is especially true for Internet applications where the limitation of a relatively low bandwidth data path still remains. The issues of regulation, synchronization, and low latency are even more difficult for Internet applications.

SUMMARY OF THE INVENTION

The invention provides an improved method and system for modeling and presenting integrated media, and in particular, interactive animation. One embodiment of the invention includes a declarative modeling language and computer-implemented system for presenting media described in declarative models. Compact models representing integrated media or interactive animation can easily be created using a text editor or other authoring tool.

The declarative models can express media and animation in terms of continuous time and discrete events. In one embodiment, behaviors can be constructed from static data types such as geometry, sound, images, and transforms to name a few. An author of a model can express behaviors in terms of time or functions of continuous time. In addition, the author can describe how behaviors change in response to events. Thus, models can include continuous time varying behavior and behavior that changes in response to discrete events.

To present the media defined in a declarative model, the system maps the declarative model into an imperative set of commands for generating media. In one implementation, a declarative modeling system parses the declarative model and creates static values and behaviors. The system renders static values repeatedly to create animation. To support reactivity, the system monitors events, and creates new behaviors in response to these events.

The approach summarized here provides a number of advantages. First, the declarative modeling language is easy to use, yet can be used to create complex models of natural media, modeled media, or a combination of both. The declarative representation is compact, secure and platform independent, which makes it especially beneficial for Internet applications.

The declarative models are easy to analyze and optimize relative to imperative programming techniques. The support for events enables the author of a model to express behavior over all time, not just between events. This feature can lead to a number of optimizations because the model can be analyzed and events can be anticipated ahead of time. This enables the system to take steps to reduce latency by performing tasks in anticipation of certain events that will occur in the future. In addition, the system can perform temporal analysis on the model to determine how it changes over time. Based on this analysis, unnecessary computation can be avoided.

A higher quality media presentation can be achieved because regulation is handled at the system level rather than in the application. The declarative model describes what to present, rather than how to present it. As such, the system can determine how to regulate the use of computer resources to provide a graceful presentation, even under adverse conditions.

Further advantages and features will become apparent with reference to the following detailed description and accompanying drawings.

DETAILED DESCRIPTION OF THE INVENTION

Figure 1:
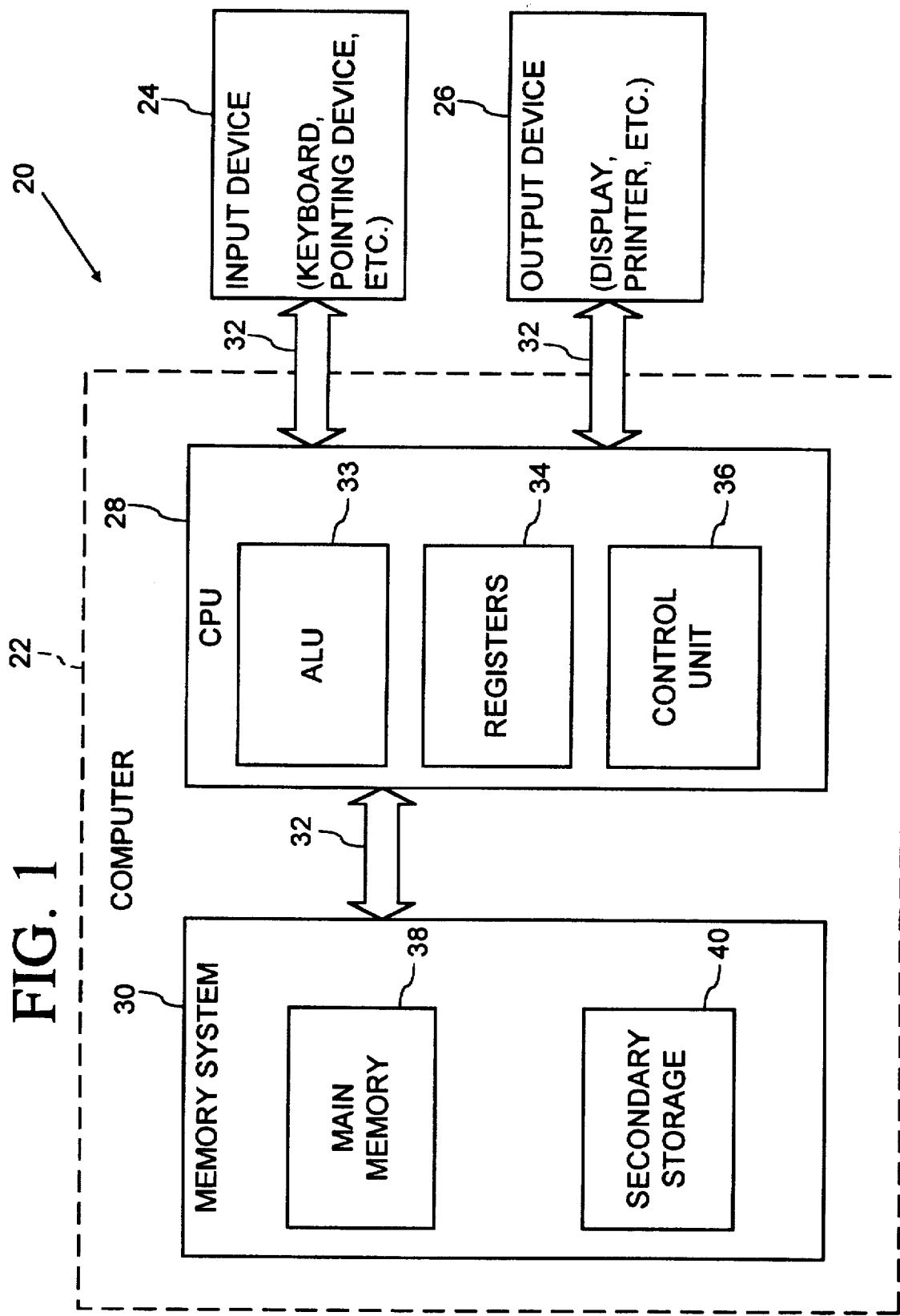
FIG. 1 is a block diagram of a computer system which serves as an operating environment for an implementation of the invention.

FIG. 1 is a block diagram illustrating a computer system 20, which serves as an operating environment for an embodiment of the invention. Computer system 20 includes as its basic elements a computer 22, input device 24 and output device 26.

Computer 22 generally includes at least one high speed processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system. The CPU 28 may be any of a number of commercially available processors. To name a few, the CPU can be a Pentium or Pentium Pro processor from Intel Corporation, a microprocessor from the MIPS family from Silicon Graphics, Inc., or the PowerPC from Motorola.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use electrical, magnetic, optical or other recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, head tracker, data glove, or other device for providing input data to the computer. Output device 26 may be a display device, modem, printer, sound device or other device for providing output data from the computer. Output device may also include a graphics accelerator board or other graphics rendering device that operates in conjunction with the display to generate display images from two dimensional or three dimensional geometry.

In accordance with the practices of persons skilled in the art of computer programming, embodiments of the invention are described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 28 of electrical signals representing data bits which causes a resulting transformation or reduction of the electrical signal representation, and the maintenance of data bits at memory locations in memory system 30 to thereby reconfigure or otherwise alter the computer systems operation, as well as other processing of signals. The memory locations where data bits are maintained are physical locations that have particular electrical, magnetic, or optical properties corresponding to the data bits.

Figure 2:
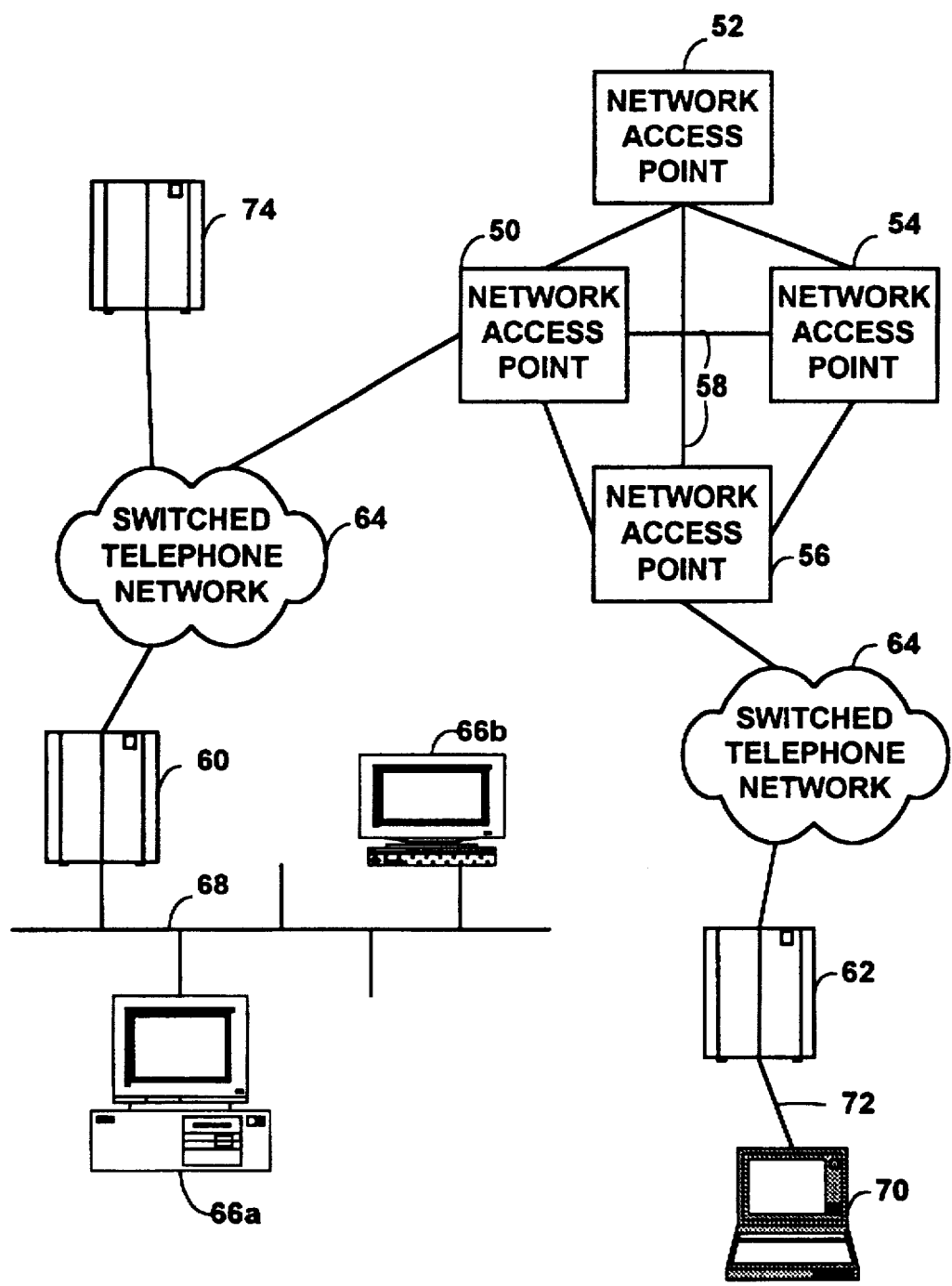
FIG. 2 is a diagram depicting a portion of the Internet.

One advantage of the invention is its suitability for applications on the Internet. Thus, before describing an embodiments of the invention in more detail, we begin with a brief overview of the Internet. FIG. 2 is a diagram illustrating portions of the Internet. As is well known, the Internet is a world-wide network of computer systems. This network includes a number of specialized servers called Network Access Points 52–56 designed to provide access to a high speed network 58. Each of the Network Access Points communicate with other servers 60, 62 through the telephone network 64.

There are a variety of possible links between end-users and the Internet. For example, if an Internet server 60 is at a local site, users (66a–b) at the site may access the Internet by communicating with the server 60 through a local area network 68. Users can also access a remote Internet server 62 by establishing a remote link to the server over a telephone line 72 using a modem. These and other widely used communication techniques are well known and require no further elaboration here.

The primary inter-machine protocol on the Internet is called TCP/IP. This is a well known ITU (International Telecommunications Union) standard OSI (Open Systems Interconnect) protocol. The TCP (Transmission Control Protocol) part is level 3 of the OSI model and the IP (Internet Protocol) part is level 2. This common protocol enables computers to communicate with other computers all around the world.

A typical sequence for accessing the Internet proceeds as follows. The user's computer 70 establishes a connection with its Internet host server 62. After establishing a connection with the host server 62, the user's computer 70 launches a browser, a program for searching for, retrieving and viewing information on the Internet and World Wide Web. To retrieve information from the Internet, the browser typically sends the path to a target server (74, for example) to its host server 62. The host server 62 retrieves requested data from target server 74 and passes it along to the user's computer 70. Examples of this data include Hypertext files, image files, graphics etc.

As noted in the background section, there is a specific need to improve the way interactive animation is represented and presented for use in Internet applications. The approach to modeling interactive animation and other integrated media described below does provide an improved way of representing interactive animation for Internet applications. The approach is not limited to supporting interactive animation on the Internet, however. Below, we begin by describing a declarative modeling approach. Then, we describe an implementation in more detail and discuss the use of this implementation for Internet applications.

One embodiment of the invention provides a declarative modeling approach to interactive animation. This approach includes two logical components: 1) a declarative modeling language for the modeling of media types including interactive animation; and 2) a computer-based system for presenting the media through one or more output devices and for supporting user interactivity through one or more input devices. The first component comprises a tool for expressing one or more media types in a declarative model. The second includes software for mapping a model into an imperative format that can be executed by a computer. In addition, the second includes software, a computer, and computer-related hardware to receive user input and produce output.

The declarative modeling approach is particularly well-suited for Internet applications for a number of reasons. The representation of interactive animation in declarative models addresses a number of key design issues enumerated above. Specifically, it is easy to use even for non-programmers. It is a more compact and is more secure than imperative programming approaches. The declarative approach improves the presentation of media as well. It facilitates optimization and analysis. It also facilitates regulation at the system software level to help ensure a more graceful presentation of interactive animation and integrated media.

The declarative modeling language in one embodiment is called the Reactive Behavior Modeling Language ("RBML"). RBML is a declarative modeling language that enables one to define a model of integrated media or interactive animation that will be valid over a period of time. In a typical environment supporting RBML, an application program represents media types using one or more RBML models. For example, an application program can present an interactive animation that is valid throughout the execution of the application. This execution typically spans one or more discrete events, as described below. The underlying system software then uses this model to create the animation autonomously from the application. In one implementation, this system software includes an RBML engine for interpreting the RBML code and controlling the presentation of media, and media presentation libraries for carrying out the presentation. This part of the system is described in more detail below.

RBML can be used to integrate a variety of media including audio, video, 2D and 3D graphics, animation, and gestural input. An RBML model provides a description of media content such as 3D geometry, sound, images, etc. Because continuous time values can be represented in RBML, an RBML model can define how the media content behaves over time. It can also define how the content behaves with respect to input to the computer such as mouse input or a key press, or through GUI controls such as a slider.

One of the conceptual building blocks in RBML is referred to as a behavior. A behavior in RBML can be thought of as a value that is continuously varying through time. For example, the value of a digital thermometer changes over time. A model representing this thermometer in RBML would treat this as a number-valued behavior. Another example of a behavior is the velocity of an airplane. This is a vector value—three numbers that represent the direction and speed. As the airplane banks, the velocity vector changes in real time. In RBML, all values are time-varying in this way. Numerical constants are just time-varying values that happen to remain constant.

Interactive animation has the following properties: "animation" referring to the motion of graphical objects over time; "interactive tracking" referring to tracking conceptual continuous input devices such as joysticks, mice, Graphical User Interface (GUI) sliders, and head trackers; and "event response" referring to response to events occurring in the animation or directly from the application or end user. RBML allows all of these properties to be modeled using the concept of behaviors.

There are a number of advantages that follow from the declarative modeling approach in RBML. First, the system software that maps the model into an imperative sequence of instructions can perform analysis and optimization. For example, the system software can analyze the intent of the programmer over time as a prelude to optimization. Data types that are usually considered static such as geometry, a vector, or color can be encapsulated with time varying behavior, stored, transmitted, and integrated at run time.

The declarative model simplifies the writing of applications that combine media types and is specifically useful in modeling interactive animation. When using RBML to model an interactive animation, the application program does not need a frame loop to generate each frame of the animation. Moreover, the application no longer requires an event loop or a web of callbacks to respond to events. In RBML, behaviors can be written to respond to events.

There two types of behaviors in RBML: non-reactive and reactive. Non-reactive behaviors do not respond to events, but can support animation. Reactive behaviors are a superset of non-reactive behaviors, and respond to events. We begin with a description of non-reactive behaviors, and later, describe reactive behaviors in more detail.

One of the building blocks of a behavior is a modeling type. RBML includes a variety of static modeling types including 3D geometry, discrete and continuous images, sounds, a 3D transform, a 2D transform, a color, point in 3D space, a point in 2D space, etc. The RBML Reference document describes these types further and also describes functions associated with them. See the Section entitled RBML reference below.

An RBML model may also include references to external components. Rather than constructing a model entirely from basic primitives, an author of a model can build on material created by others, even if it is another format. There is an enormous amount of raw material available today, both commercially and freely on the Internet, that can be used as a starting point for constructing interactive animations. This material is in the form of files in many different formats representing geometry, images, video, sound, animation, motion paths, etc. RBML works with these representations directly, rather than requiring authors to create raw material specifically for RBML, or even converting existing material into a new format.

Consider an example of a bust comprised of: (a) a VRML 1.0 model of a cube, and (b) a 3DS model of Shakespeare's head. An author can includes these models in an RBML model by means of "import", and name the results for later use.

cube=import("cube.wrl")
head=import("shakespeare.3ds")

In addition to the static values described above, another building block of behavior is time. Behaviors can be time varying by expressing them in terms of time or functions of time. A special case of non-reactive behaviors are constant behaviors, which maintain the same value for all time. Examples include the static geometry value cube, and the value representing the unit y-vector, yVector.

In RBML more complex models can be created through a concept called composition. Composition involves the nesting or combination of behaviors to create new ones. Consider the example below:

```
bust =
let
    base = scale (1,3,1) (cube)
    top = translate (0,3,0) (head)
in
    base union top
```

This is a simple example of a model of a graphical object representing a bust. The bust is the "union" or combination of base and top behaviors. In this example, the base is a cube scaled in 3D by the factors (1, 3, 1), corresponding to x, y, and z directions in the (x, y, z) coordinate system. Top is a graphical object called "head," which is translated by a factor of 3 in the y direction (0, 3, 0).

Each part of the model is constructed by starting with simple behaviors and building on them to create a more complex model. For instance, the static cube is scaled to create a another static geometry called base. The static geometry, head, is translated to create a new geometry called top. Finally, the bust is constructed by combing the base and top with the "union" function. In this manner, more sophisticated models can be constructed from more elemental ones. As shown in this example, RBML enables the user to apply a behavior to another behavior or to combine behaviors to create new, more sophisticated behavior.

In RBML, naming and composition are completely independent, so the author is free to choose how much and where to introduce names, based on individual style, and intended reuse. Naming is useful for making descriptions understandable, reusable and easy to remember, but can lead to a cluttering effect. When intermediate models are named for the purpose of using in one or a few models only, they can interfere with choices of intermediate names used to help describe other models. While this cluttering is not a problem with very simple models, described and maintained by a single author, it can become a serious obstacle as complexity grows and separately authored models are combined to work together.

The solution to name clutter is to explicitly limit the scope of a name's definition. In the example of a bust above, the bust definition is unscoped, but the scope of the base and top definitions is limited with the let and in constructs. The author is free to reuse these names in other models without conflict with the base and top definitions in this model.

Another way to create effects using RBML is to parameterize a model or a behavior with another behavior. RBML behaviors may be defined in terms of a variety of different parameter types, including another RBML model. The following example builds on the example above.

```
bust(basecolor, headAngle) =
let
    base = baseColor(scale(1,3,1) (cube))
    top = translate (0,3,0) (rotate (yAxis,headAngle) (head))
in
    base union top
```

Here, the model of the bust is modified by parameters "baseColor" and "headAngle", which are behaviors defined elsewhere in the model. Within the model of the bust, "baseColor" is applied to the scaled cube, which sets the color of the base to the color, "baseColor." "headAngle" is a parameter to the rotate function, which is applied to the head to cause it to rotate about the y axis.

Parameters can be constructed from expressions to create more sophisticated models. For example, a parameter such as an angle, a color value, or a position can be expressed as a function of time. As another example, a parameter can be expressed in terms of a conceptually continuous input device such as mouse.

In RBML, time varying behaviors are created by parameterizing models with time. Consider the following example:

rotate(yAxis, 2* pi * time) (head)

In this example, the angle parameter is expressed as a function of time. When used in the model of a bust above, this behavior causes the head to rotate about the y axis as time progresses. By allowing the author to parameterize the model with time or functions of time, the author can easily create animation without having to worry about generating each frame of the animation. Instead, the system software processes the model and generates frames of animation transparently to the author.

Input devices can also be represented in RBML models. Input devices such as a mouse, a head tracker and a Graphical User Interface slider are each represented as conceptually continuous devices. The user can create animation by using values produced by these continuous device models as parameters. The examples below will help illustrate this concept.

```
let
    hue = xComponent (mousePosition)
    angle = (pi/4) *sin (time)
in
    bust (colorHs1 (hue,0.5,0.5), angle)
```

In this example, the RBML model includes two sources of animation: the angle behavior is expressed as a periodic function of time, and the colorHs1() behavior is expressed as a function of a conceptually continuous input device.

The behavior "hue" is defined as a function of the x component of the position of the mouse (mousePosition). When used as a parameter to colorHs1(), hue controls the intensity value of one of the color components. As the x position of the mouse varies, the value of hue changes, and the color of the bust changes accordingly.

The angle behavior is a periodic function of time. It begins at local time zero as the value zero and then varies between $\pm\pi/4$ radians (i.e., $\pm 45$ degrees). It repeats every $2\pi$ seconds, the period of the sine function. The constant time represents local time in seconds. When used as a parameter to bust, the angle causes the head to oscillate back and forth.

Figure 3:
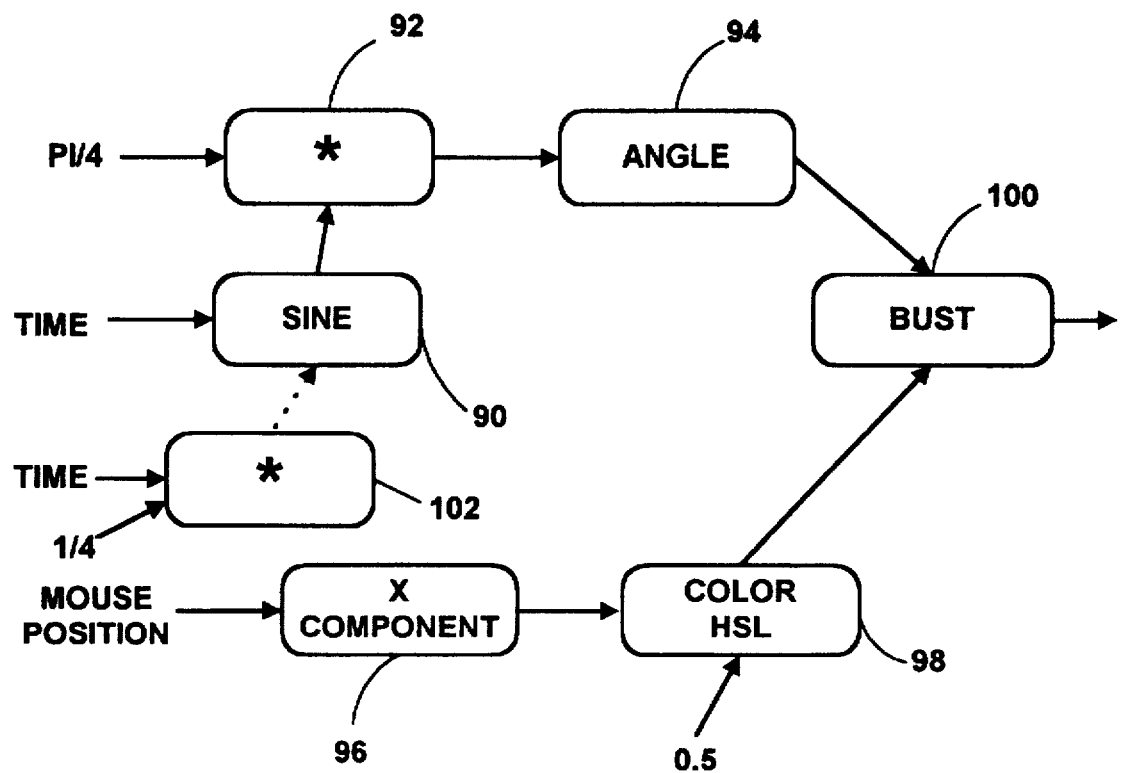
FIG. 3 is a data flow diagram illustrating an example Reactive Behavioral Modeling Language (RBML) model of interactive animation.

FIG. 3 illustrates a data flow diagram of the last example. As shown in this diagram, the behaviors in RBML can be represented as a continuous data flow. The inputs to the data flow are time and mousePosition and the constants pi/4, and 0.5. The sine function (90) is applied to time to create a periodic function, and the periodic function is multiplied by pi/4 (92) to produce the angle behavior (94). The mousePosition is assigned to xComponent (96), which is a parameter of colorHs1 (98) along with two constants, 0.5 and 0.5. The behaviors, angle (94) and colorHs10 (98) are passed to the bust. Data continues to flow according to this data flow graph as time progresses. The data flow graph represents the relationships among the behaviors in the model until either the model behavior terminates or an event occurs that causes a change in the data flow graph.

As another example of time varying behavior, consider the following example comprised of 3D polygons representing a vessel, sailBoat, centered at the origin. The angle behavior described above can be used to rock the boat:

heel=Rotate(zAxis, angle)

sailBoat1=heel(sailBoat)

The call to Rotate returns a geometric transformation that has been specialized by the axis and angle. The effect of applying heel to the boat geometry is that the boat begins upright and then heels to one side and then the other, passing through upright approximately every second and a half with the characteristic sinusoidal velocity.

In RBML, the time used to parameterize behaviors is not clock time but a local time line that starts at zero. This allows a behavior to be time transformed, e.g., time-shifted to start at any global (clock) time, and time-scaled to change its duration. Animation effects like slow-in and slow-out can also be expressed as time transformations. Basing behaviors on local time also allows them to be defined in a modular fashion, with each behavior conceptually in its own time line. Behaviors can then be used as the building blocks for more complex behaviors.

In addition to continuous behavior, RBML also provides for reactive behavior. While time in RBML allows a user to describe behavior that varies continuously over time, the support for reactivity enables the user to describe behavior that varies in response to discrete events. An event is something that can trigger a discrete change in behavior. In RBML, an event produces, at the time of the event, some data associated with that event that can be used in a new behavior after the event. This feature allows events such as state changes and mouse clicks to be integrated with time-varying values.

The following types of events are supported in RBML: system events, Boolean events, handler events, and alternative events. System events are events that originate from the operating system. For example, in the Windows Operating System from Microsoft Corporation, system events include LeftMousePress, RightMousePress, KeyPress, etc. These types of system events can be represented as RBML events in an RBML model.

A Boolean event is an event that occurs in response to a transition of a Boolean condition from false to true. The following are example Boolean behaviors:

x<=minx and dx<0

In this example of RBML code, an event occurs when the Boolean expression evaluates "true". In other words, if x is less than or equal to a minimum value (minx) and the derivative of x (dx) is less than zero, than an event occurs.

Handler events enable the user to create more complex events from other events. If e is an $\alpha$ event and f is a function with type $\alpha \rightarrow \beta$, then e=>f is a $\beta$ event. Intuitively, this means wait for event e, and then take the data produced by that event and run the function f on it to produce something with type $\beta$. This event happens at the same time that e did, and produces the new piece of data. Consider the example:

keypress>=capitalize

This example in RBML means wait for an event "keyPress" and run the function "capitalize" on the data produced by the event.

Alternative events enable the user to specify a number of events from which the system will select based on which event occurs first. The system then selects which event occurs first and returns the data corresponding to that event. If e and e' are $\alpha$ events, then ele' is an $\alpha$ event that means, intuitively, choose whichever event, e or e', happens first, and return the corresponding data for it. If e and e' happen at the same time, it is undefined which will be chosen. Consider the example:

leftButtonPress I x<=minx

The system will monitor these events. If leftButtonPress occurs first, the data associated with it will be returned. If on the other hand, x<=minx occurs first, the system will return the data associated with it.

In RBML, the until construct is used to form reactive behaviors. For example, if b is an $\alpha$ behavior and e an $\alpha$ event, then b until e is a reactive behavior with type $\alpha$ behavior. Intuitively, this statement means the behavior is b until the event e happens, and then becomes the behavior specified by the event data. Here is a simple example model that instructs the system to display the color red until the mouse button is pressed, and then instructs it to display the color green.

red until leftMousePress=>green

As another example, the following expression produces a geometric transformation equal to the identity transform until a buttonDown event. After the event, the system displayss an animated rotation of π/2 radians, or 90 degrees, per second around the Z axis:

myxform=identityTransform until buttonDown=>Rotate (zAxis, pi/2 * time)

This transformation may be applied to animated geometry to create a reactive geometry, for instance:

myGeom=myXform(VRMLModel("gesso.vrml"))

Reactive behaviors can be illustrated with state diagrams. Consider the following example, where "LBP" means left-ButtonPress:

```
red until
    LBF => green until
        LBP => yellow
```

Figure 4:
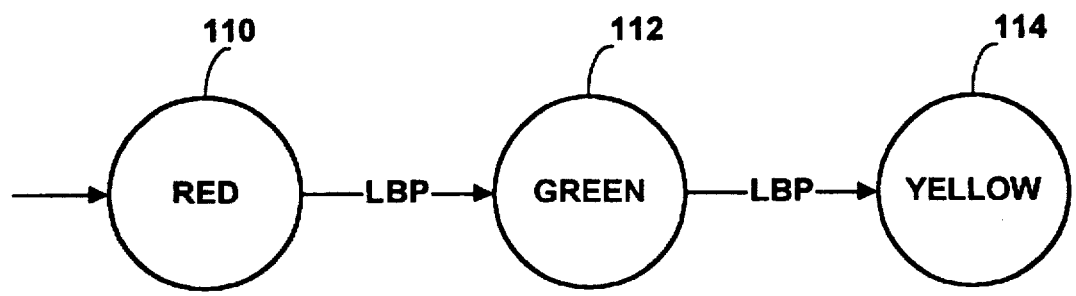
FIG. 4 is a state diagram illustrating an example of reactivity in RBML.

FIG. 4 is a state diagram illustrating this simple example of reactivity. The state diagram begins at state 'red' (110). In response, to the leftButtonPress, the state transitions to 'green' (112). Finally, in response to another leftButtonPress, the state transitions to 'yellow' (114).

RBML also supports cyclic behavior using events.

```
cyclic =
    red until
        LBF => green until
            LBP => cyclic
```

Figure 5:
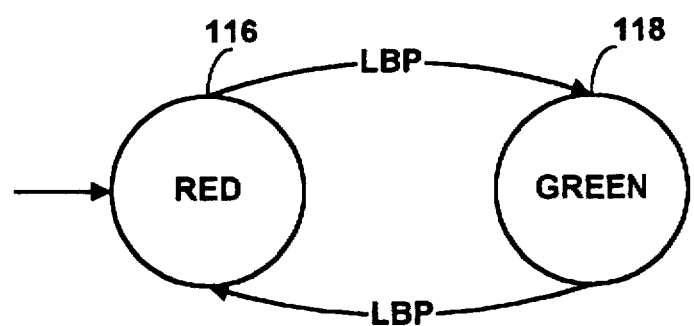
FIG. 5 is a state diagram illustrating an example of cyclic reactivity.

FIG. 5 is a state diagram illustrating the cyclic nature of this example. The system transitions from a display of red and green color (116, 118) in response to each press of the left mouse button. While this is a simple example, it illustrates the power of the model to express changes in behavior at a high level.

The previous example can be embedded in a hierarchical model as shown below.

```
cyclic until
    RBP => yellow
```

Figure 6:
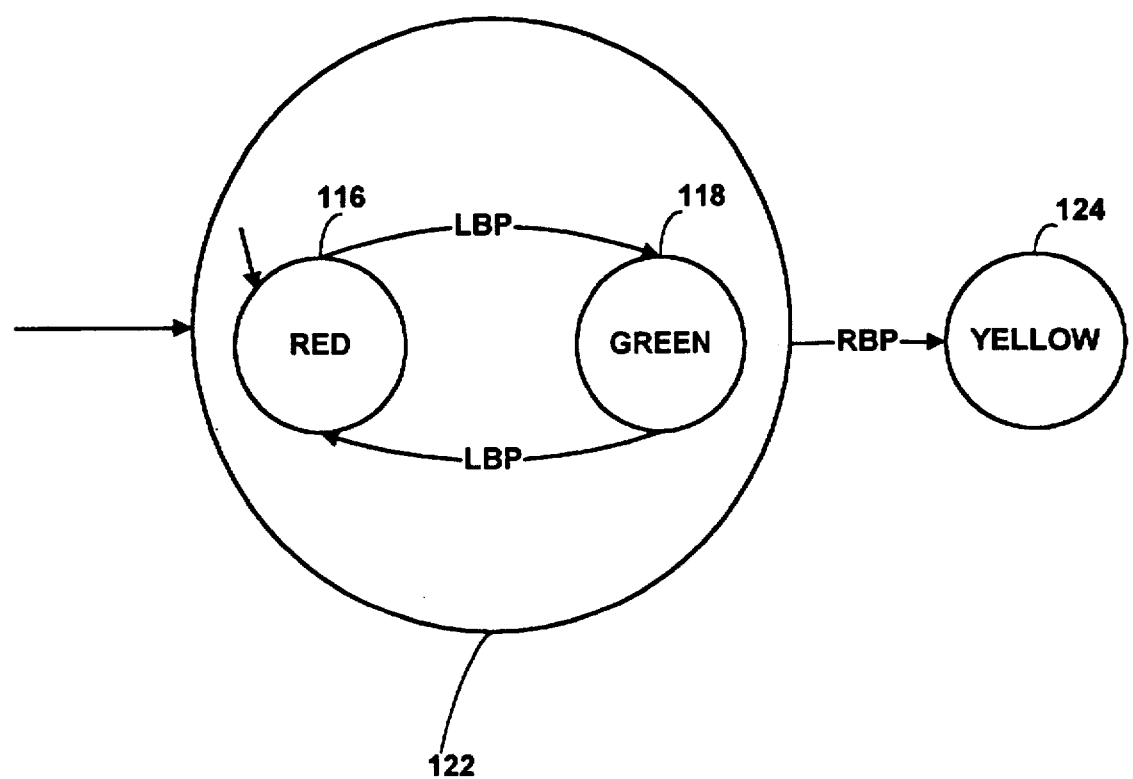
FIG. 6 is a state diagram illustrating an example of hierarchical reactivity.

With addition of this RBML code, the behavior is cyclic until a leftButtonPress event. In response to this event, the system displays the color yellow. FIG. 6 is another state diagram illustrating this hierarchical reactivity. As shown in the state diagram, the cyclic behavior of FIG. 5 is nested in a state (122). The system transitions from this state (122) to a state with behavior "yellow" (124) when the user presses the right mouse button.

RBML also supports parametric reactivity. Consider the following example:

```
score(curr) =
    curr until
        scored => score(curr + 1)
      | curr=max => curr
```

In this example, the value of score(curr) is curr until the scored event occurs. In response to this event, the value of curr is incremented. This behavior repeats in response to the scored event. This example also includes an alternative event, which occurs when the value of curr equals the value 'max.' When curr equals max, an event occurs which prevents further increments to curr.

Parametric reactivity enables one to describe related reactive behavior in a compact form. Rather than describing a sequence of reactive behavior with separate expressions, for example, one can define all of these behaviors at once as shown in the example above.

Above, we illustrated the behaviors in an example of model using a data flow graph. The system software generates this data flow when instructed to execute an RBML model. When events occur, the system modifies the behaviors in the data flow graph that are affected by the event. Consider the example depicted in FIG. 3, modified as follows:

```
angle = (pi/4) *sin (time) until leftButtonPress =>
        (pi/4) *sin( time/4)
```

In this example, the data flow graph is as shown in FIG. 3 until the user presses the left mouse button. At that point, the input to the sine function changes from time to time scaled by ¼ (see 102 in FIG. 3). To carry out this change in behavior, the system modifies the data flow graph in response to the leftButtonPress event such that the input to the sine function becomes a new behavior, time scaled by ¼. This example highlights a powerful feature of events in RBML: the RBML model specifies behavior across all time, including what happens when events occur. This feature enables the system that interprets and processes the RBML model to improve regulation and to optimize performance.

Reactivity in RBML improves regulation because the system can determine ahead of time all possible events and predict reactive behavior before it occurs. This enables the system to make more efficient use of computer resources. The system can reduce latency by predicting events before they occur and taking steps to prepare for them. For example, if an event causes a texture to be mapped to the surface of an object in a scene, the system can begin retrieving the texture from memory before the event occurs. If an event requires that a video or sound file be decompressed and loaded from disk before playback, the process of decompressing and loading the data can be initiated ahead of time and latency can be reduced. As another example, the system can reduce latency in establishing a network connection by foreseeing that it may occur and establishing a connection ahead of time.

A variety of other optimizations are also made possible because of the support for events in RBML. One optimization involves the use of temporal analysis to eliminate overhead in, for example, generating images in a graphics scene or generating sounds. Since behavior can be predicted, the system can determine ahead of time which geometry will form part of a scene and queue it for rendering. Temporal analysis can be used to reduce unnecessary computations such as rendering geometry that is not potentially visible in a scene, or rendering sound data that is masked by other sounds.

Another useful construct in RBML is a "snapshot." The snapshot construct may be used to make a (dynamic, time varying) behavior, static (i.e., no longer varying with time). This is useful when one wishes to record the instantaneous value of a time varying behavior for some other use. For example,

```
0 until snapshot (LeftMousePress,  xComponent(mousePosition))
``` is the static behavior 0 until the left mouse button is pressed, and then becomes the static value of the x coordinate of the mouse position at the time of the press. The behavior 0 until LeftMousePress=>xComponent(mousePosition)

is different in that it produces a behavior that continues to vary with time and track the x coordinate of the mouse after the press event occurs.

In RBML, the user can specify when a behavior terminates using the end construct. The end construct is of type α (i.e., it is any type) and it, intuitively, means immediately terminate the behavior. For example, let b=time until LMP=>end is a behavior that varies with time until the left mouse press event and then terminates. If a behavior is defined in terms of other behaviors and one of those behaviors terminates, then the behavior itself terminates. For example, consider let b'=f(b,3)

If behavior b terminates, then b' terminates at the same time. The construct done is a unit event that can be used to detect that a behavior has terminated, and act accordingly.

Consider the following example:

```
let repeat (b) =
    b until
        done => repeat (b)
```

This function takes a behavior b and runs it until it terminates, and then starts it again.

To improve modularity, all behaviors are defined to begin at local time zero in RBML. Consider b unitl e=>b' and assume b is the main behavior of the RBML model. When b is performed the system begins at, for example, global time $t_{global}$. This is by definition, time=0 for b. The event e occurs when it happens the first time after $t_{global}$ (i.e., the first time after its local time 0). Suppose this is at time $t_{event}$ (as specified in global time). Then at global time $t_{event}$, b' is performed starting with its local time 0.

According to global time, this behavior was b until $t_{event}$ and then became b'. As for b, its time went from local time 0 to local time ($t_{event} - t_{global}$) and then b' was started with its local time 0 (assuming that no other time transformations are in effect).

Here is a simple example. Consider the following behavior:

```
green until
    time = 2 =>
        blue until
            time = 1 =>
                red
```

This behavior is green for 2 seconds, and then blue for 1 second, and then red.

The timeTransform construct may be used to change the interpretation of local time. The function has type timeTransform: α* number->α and it uses the number to redefine how time local time is interpreted within a behavior. Consider the following:

doublespeed=time*2
b=playvideo(video)
doublevideo=timeTransform(b, doublespeed)

This will result in a behavior that plays the video at twice its natural speed. The perspective of global time, each 1 second interval corresponds to 2 seconds of local time. The effects of time transformation are cumulative. For example, timeTransform(doubleVideo, doublespeed)

ends up with a behaviors that plays at 4 times the original video speed. To be well defined, the number, n, argument for the time transform will be required to satisfy two rules: 1) Monotone; for all times $t_0$ and $t_1$, if $t_0<t_1$ then (n at time $t_0$)<(n at time $t_1$); and 2) Non-negative; For all times t, t, at t is non-negative.

Monotonicity is required to make event reaction sensible (event transitions can not be undone). Time always increase to prevent trying to define a behavior before local time 0 (e.g., it may not make sense to sample a behavior like a video before local zero).

Certain behaviors, principally those defined by system or user input devices, may not be transformed in time in the same way that synthetic behaviors can be. Such devices ignore (or invert) the user-defined time transformation when being sampled. The time transformation is actually a combination of the active time transformation and the start time.

RBML also supports integrals and derivatives on continuous, time varying behavior. With RBML, the author of a model can express time varying behavior in the form of expressions with integrals or derivatives on values that vary continuously over time. For example, a variety of data types supported in RBML including real numbers, points, vectors, and quaternions can be operated on by derivative or integral functions. To support the integral function, the RBML engine performs a forward-differencing algorithm to make numerical integration efficient. To support the derivative function, the RBML engine can either use symbolic differentiation or can compute a derivative numerically using its mathematical definition.

The author of a model can use the constructs described above, and described in more detail in Appendices A and B, to create descriptive models of animation or other media. A typical model is comprised of a text file written in RBML. To execute the model, this text file, or a compiled version of the model, is passed to system level software responsible for analyzing the model and mapping it into an imperative form controlling its presentation.

Figure 7:
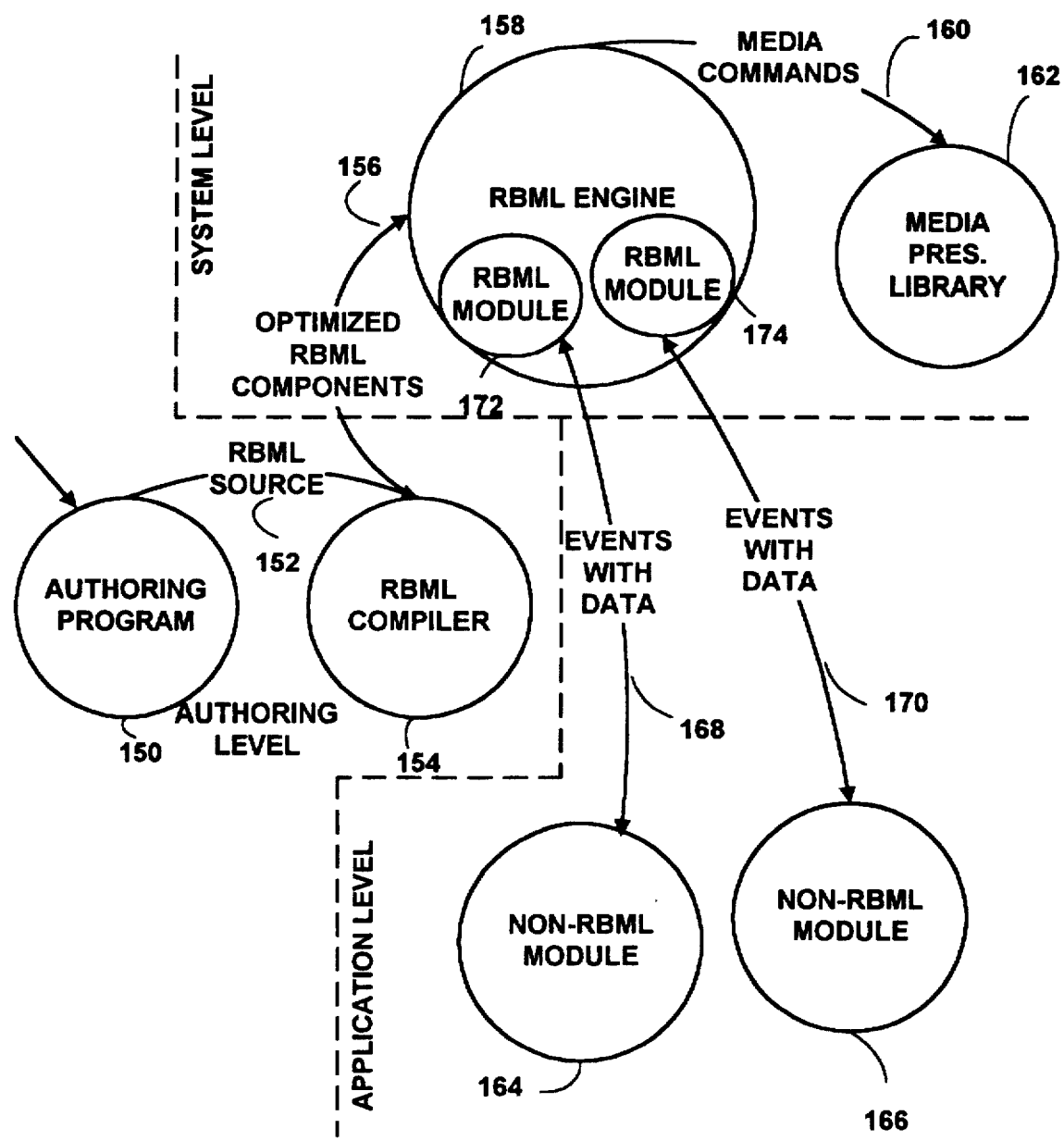
FIG. 7 is a functional block diagram illustrating the architecture of an embodiment of the invention.

FIG. 7 is a block diagram illustrating the architecture of an RBML system from authoring time to run time. The diagram is separated into three sections: authoring level, application level and system level.

The authoring level of the system includes tools for creating and optionally compiling RBML source code files. An authoring tool 150 is a program that enables a user to create RBML source code 152. This can include a simple text editor for creating RBML models, or more sophisticated graphical authoring tools. Whether the author creates the model with a text editor or a graphical authoring tool, the format of the RBML source 152 at this level is a ASCII text file. The compiler 154 shown in this diagram is designed to compile RBML source code into a form for fast processing. As an alternative, the RBML source code can be interpreted at run time. We elaborate further on the interpretive approach below.

The system level portion of the diagram includes the RBML engine 158 and media presentation libraries 162. The RBML engine 158 is responsible for reading and interpreting (if necessary) the RBML code and controlling the execution of the RBML model. During execution of the model, the RBML engine 158 controls the presentation of the media described in the RBML model and regulates computer resources including such functions as memory management, and control of media presentation under varying conditions. Since the RBML engine controls media presentation for all models, regulation of the output can be centralized within it. To maintain smooth, continuous output under varying loads or across different platforms, it is sometimes necessary to use graceful degradation techniques that reduce the overhead in presenting the media without unduly affecting the quality of the output. Graceful degradation techniques that can be supported in the RBML engine include reducing the frame rate (straight forward given the continuous time model in RBML), reducing the spatial resolution, using geometric levels of detail, and using simpler audio filters.

To present media output, the RBML engine issues media commands 160 to media presentation libraries 162, which interface to the presentation hardware in the computer system. The media presentation libraries include, for example, DirectDraw for image and video rendering, DirectSound for audio rendering, and Reality Lab or Direct3D for geometry rendering. Each of these libraries are media presentation Application Programming Interfaces (API) for a Windows Operating System environment from Microsoft Corporation. In the alternative, other media presentation libraries can also be used. Other examples of media presentation libraries include OpenGL from Silicon Graphics, Inc., for graphics; XIL from Sun Microsystems, for video and still images. Software interfaces for input devices such as the mouse or keyboard are typically provided with operating systems such as the Windows Operating Systems from Microsoft Corp., Solaris for UNIX systems from Sun Microsystems, and the MacIntosh O. S. from Apple Computer Co.

The application level of the system can include one or more application programs. Application programs can communicate with the RBML engine 158 through an application programming interface. This type of interface enables applications to access functionality provided by the RBML engine. In one specific implementation, for example, applications communicate with the RBML engine by making calls to functions in a programming interface. This interface includes functions to read, interpret and display an RBML model.

Another feature of this declarative modeling system is its support for integration of declarative models and imperative programs. Inter-language integration enables application developers to write applications incorporating both RBML models and non-RBML code. For example, parts of an application can be written in an imperative programming language such as C or Visual Basic, while other parts can be implemented in an RBML model. This feature allows the application developer to exploit the strengths of RBML for integrating time varying media and animation, and imperative programming for implementing a sequence of discrete operations. In addition, integration allows developers to extend the functionality of RBML Some examples will illustrate the concept of integration of RBML and non-RBML modules. To enhance a user interface for a spreadsheet application, the developer may want to create a 3D model of a spreadsheet. The animated interface is much easier to represent in RBML, while file manipulation functions are easier to implement in an imperative programming language. The application, therefore is preferably implemented by integrating a user interface in an RBML model with the remainder of the application implemented using imperative code. When a user interacts with the user interface such as clicking on a cell in the spreadsheet for example, an RBML event may occur that should be communicated to a non-RBML module. This is an example where the RBML module transfers information to a non-RBML module. Consider another example where a user interface control, implemented in Visual Basic, is used to initiate an animation described with an RBML model. In this case, an event in the non-RBML module needs to be communicated to the RBML module. Below we describe alternative approaches for integrating non-RBML and RBML modules in an application.

One method of inter-language integration involves conversion of an RBML event to a non-RBML event. One way to convert an RBML event to a non-RBML event is to invoke a callback function when an RBML event occurs and pass the event data as a callback argument. During event monitoring, an event monitor invokes this callback function each time an RBML event occurs.

This integration method is illustrated in FIG. 7 by the paths 168, 170 from the RBML modules to the non-RBML modules. The RBML module communicates the event to the non-RBML module by invoking the callback function and passing the event data. Thus, the interlanguage communication is referred to as "events with data" as shown (168, 170). Note that the RBML modules are shown as part of the RBML engine 158 to reflect that they are processed in it. However, the RBML modules can be part of an application.

One specific use of this inter-language communication mechanism is convert a continuous behavior into a stream of discrete events with data. To accomplish this, the developer creates an RBML event that occurs frequently and then combines this event with an RBML behavior. At runtime, the event monitor in the RBML engine invokes a callback function when the RBML event is detected and passes the value of the behavior and the time with each event. As events occur, the RBML engine generates a stream of discrete samples of the behavior along with time of each sample. Since imperative programs typically operate on static values, this feature is one way to make static samples of time varying behavior available to an imperative module. An imperative module can, for example, use the stream of static values to analyze an animation.

Non-RBML events can be converted to RBML events using an RBML primitive event that can be constructed from C or some other imperative language. This primitive event can implemented as a C object. At runtime, the RBML engine notifies the C object to start monitoring the event on the C side. To trigger this event, a C module calls the C event object and passes it time and event data as arguments. In response, the C object causes an event on the RBML side to occur. The C event object provides a useful mechanism for enabling non-RBML modules written in C to trigger RBML events. While this example specifically refers the C programming language, it applies to other imperative programming languages as well.

Another method for a non-RBML program to communicate with an RBML module is through behavior elevation. Consider an example of inter-language communication between a C program and an RBML model. Behavior elevation in this context refers to taking a C header file and generating a compiled RBML-callable module, together with an RBML header file. The RBML header file is analogous to a C header file, but is referred to in an RBML module via the RBML equivalent of the C/C++#include statement. In one embodiment, an elevator in the RBML engine elevates functions in C to analogous functions callable from RBML. This elevation is described further below.

In addition to elevating non-RBML functions to behavior producing RBML functions, non-RBML functions can also be elevated into event producing functions. As one possible example, assume the non-RBML function is one that either returns a value of some type α, or raises an exception, "noevent." This function can be elevated to an event in RBML by having it return an event with data of type α. To detect such an event, an event monitor in the RBML engine would invoke the original, non-RBML function on sampled arguments and then analyze the results. If the function raises the "noevent" exception, no event has occurred. If the function returns a value of x, for example, then an event has occurred with data having a value, x.

Elevation enables developers to extend the functionality of RBML by creating non-RBML functions and then elevating them so that they operate on behavior instead of static values. The original functions operate on static values to produce static values. The elevated functions operate on behaviors and produce behaviors. In some cases, however, there are drawbacks to the elevation approach. One drawback to elevating imperative functions is that the RBML compiler cannot easily optimize the imperative functions. To the RBML compiler, these functions are a black box, and as such, are difficult to analyze and optimize. Elevation of imperative functions also tends to undermine the inherent security provided by a declarative model. A declarative model is secure because it is not in machine executable form, but this is not necessarily true of imperative functions. Finally, the elevated code is often not machine independent and therefore may not be readily usable across a variety of platforms. Despite these issues, elevation is still a viable option to integrating non-RBML and RBML modules and extending the functionality of RBML.

Figure 8A:
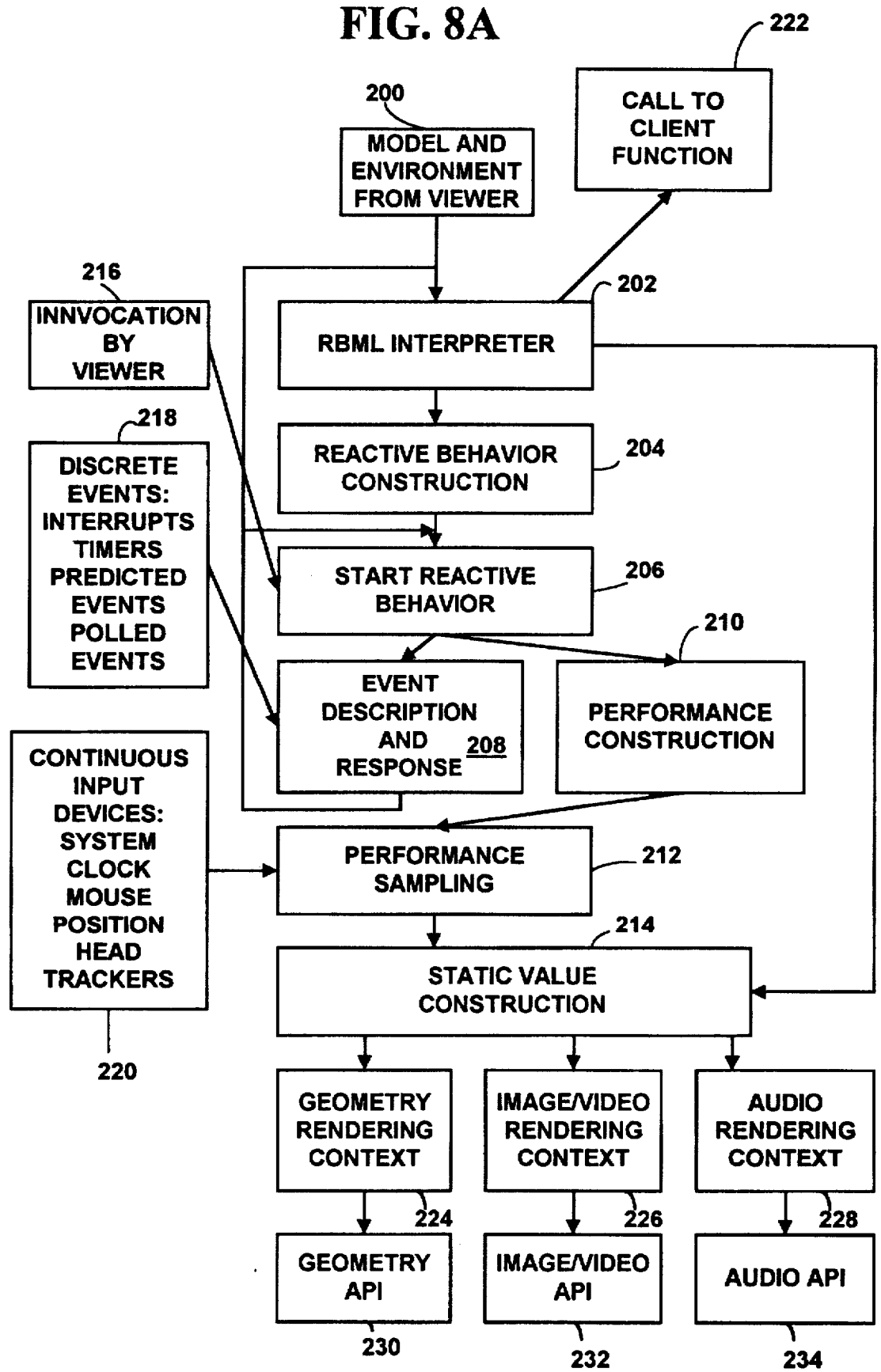
FIG. 8A is a functional block diagram depicting an RBML engine in one embodiment of the invention.

FIG. 8A is a functional block diagram illustrating the RBML engine in more detail. FIG. 8A also illustrates an example of how the RBML engine interacts with an RBML viewer. As shown, one possible source of an RBML model is from an application program, which in this case is an RBML viewer. In this embodiment, the RBML viewer is implemented as an OCX package, and can reside in the IExplorer browser from Microsoft Corporation as well as other OLE containers.

In this example, the process of executing an RBML model begins when the viewer supplies an RBML model for evaluation (200). The interpreter 202 reads the RBML model and creates reactive behaviors (204) and static values (206). To accomplish this, the interpreter parses the RBML model and creates an abstract syntax tree. These and other functions of the interpreter are described further below in connection with FIG. 9.

After the interpreter creates the abstract syntax tree, the RBML engine builds a behavior graph (204). The behavior graph is a functional graph comprised of the behaviors in the model. The RBML engine may also identify static values in the abstract syntax tree and construct these static values as shown (214). Identifying and processing static values at this point is an optimization based on the observation that parts of the abstract syntax tree represent static values, which are not time varying. Since the static values do not vary with time, they do not require sampling. Behaviors, on the other hand, are time varying and must be sampled to generate static values.

In this implementation, the RBML engine has an application programming interface including functions such as read script, interpret, display, etc. In response to a call to the display function, the RBML engine starts the main reactive behavior of the model (216). At this point, there are two logical threads, although the implementation may actually use fewer or more process threads. These logical threads include the event monitoring and response thread (208), and the performance sampling thread (210).

The event monitoring and response thread monitors discrete events such as interrupt driven events, mouse clicks or keypresses, and timer events (218). It also monitors predicted, polled, and hybrid events. A predicted event is an event where the time of the event is known before it occurs. For example, timer(5) (a five second time) will cause an event five seconds from its start time. An example of a polled event is a Boolean behavior, which may become true upon testing. A hybrid event is an event composed of event types, such as an event combining the "and" and | (alternative) operators.

In response to some events, the event monitoring and response thread invokes handlers. These handlers either cause existing behaviors to generate new performances, or cause existing RBML handler code to create new behaviors. The first type of response is reflected by the arrow back to block 206 where an existing behavior generates a new performance. In this case, the RBML engine creates a new performance subgraph and adds this subgraph to the existing performance graph. We explain the performance graph in more detail below. The second type of response, where existing RBML handler code creates a new behavior, is illustrated by the arrow back to block 202. In this case, the interpreter processes the RBML handler code and generates a new behavior or behaviors.

The second logical thread is the performance sampling thread. The RBML engine creates a performance graph from the behavior graph (210). The RBML engine creates a performance by taking a behavior and a local start time and mapping the behavior to a global time. When an event occurs that initiates a reactive behavior, the RBML engine takes the start time of the event and creates a performance.

The performance sampling thread supports continuous animation and interaction through the sampling of time from continuous input devices. One of these input devices is the system clock, which controls the progression of time represented in an RBML model. Other input devices relate to user interaction and include, for example, the position of the mouse, the position of a head tracker, or the position of a GUI slider.

The RBML engine samples behaviors to create static values. A performance of a type α yields a value of type a upon sampling. As a replacement for the traditional frame loop, performance sampling takes conceptually continuous behavior and produces discrete samples. The result of this sampling is the construction of static values such as a geometry, an image, sound, a transform, color, etc. The RBML engine produces time varying output by applying static operations to static values over and over.

Static values are primarily built from primitive values and composition as explained above. Primitive values include geometry, images, sound, transforms, colors, points, etc. The static value types supported in RBML are described further in the RBML reference below.

In constructing static values, the RBML engine sometimes creates a static value graph. A static value graph is a data structure setting forth the components of a static value and describing the relationship among the components. The static value graph is especially useful in describing composite static values. For example, consider the example of a bust above, which is the union of two pieces of geometry. A static value graph for this example specifies how to aggregate the components of the bust during rendering.

In this implementation, static values are implemented as objects using an object oriented programming approach. Objects for the static value types have a rendering method, which the RBML engine invokes to render static values or composite static values. To render a static value for a single primitive, for example, the RBML engine calls the render method for that primitive and the object renders itself.

An object composed of two or more static values renders itself by making repeated calls to the appropriate rendering method to render the objects within the composite object. By invoking the render method on a composite object, the RBML engine automatically triggers the rendering of other objects. As an example, consider the model of the bust which includes two elements of type geometry combined with the "union" operator. The RBML engine invokes the render method on the composite object representing the bust. The "union" operator causes the render method to be invoked twice: once to render the head the base, and a second time to render the base.

The RBML engine controls the generation of output by making calls to the media libraries to render the static values. In this implementation, the RBML engine includes a program entity called a rendering context that accumulates state information during rendering. The rendering context can include a variety of state information used to render a static value or values such as a drawing context, a bounding box of geometry being rendered, color applied to a set of geometric objects, or an accumulation of geometric transforms to be applied to geometry. When a static value of type geometry renders itself, it uses the state information in the rendering context. In this implementation, the RBML engine creates separate rendering contexts for geometry (224), image/video (226), and audio (228). This is only one possible implementation; it is also possible to have a single rendering context for all static value types.

While rendering the static values, the RBML engine makes calls to media APIs that assist in rendering and control the output of media on output devices. In this implementation, there are three separate media APIs including a geometry API 230, an image/video API, and an audio API. The geometry API controls the rendering of a 2D and 3D graphical objects. The image/video API controls the rendering and display of images or a sequence of images. The audio API controls the playback of one or more sound files. As noted above, there are a number of commercially available media APIs. The media APIs used in this implementation include the DirectDraw API for video and image rendering, the DirectSound API for audio rendering, and the Reality Lab or Direct3D API for geometry rendering. The DirectX APIs are described in the DirectX SDK from Microsoft Corporation.

The RBML engine performs efficient memory management using a transient memory heap. It is not possible to determine before rendering how much memory should be allocated to render each frame of animation. As such, the RBML engine must allocate memory dynamically. Unless memory is reclaimed, the RBML engine can run out of memory. The RBML engine addresses this problem by dynamically allocating memory with a transient memory heap. As the RBML engine renders objects for a frame, it adds to the transient memory heap and adjusts a pointer to free, allocated memory. After a frame is generated, the RBML engine resets the pointer and reclaims the memory allocated in the transient heap for the previous frame.

The transient heap is not used in all cases, however. In some cases, some behaviors remain constant from frame to frame. To reduce computational overhead, these behaviors need not be re-processed for every new frame. Instead, the static values representing these behaviors can be saved and re-used. In this case, the RBML engine allocates memory for constant values (values that do not change from frame to frame) using the system heap.

The RBML engine can make calls to other applications running in the same or another computer. To provide better security, this implementation of the RBML engine calls functions of other client applications that are registered with it (222). The example of the Internet browser and the RBML viewer will help to illustrate this concept. Consider an example where the RBML engine needs to execute a hyperlink to another Web page or has to fetch data from the Internet. In the first case, the RBML viewer registers a hyperlink function with the RBML engine. The RBML engine can then make a call to the hyperlink function where necessary. In the latter case, the browser registers a function to fetch Internet data with the RBML engine. Then, if the RBML engine needs to fetch data from the Internet, it makes a call to the function for fetching the data in the browser application.

With respect to Internet applications, it is also important that the media representation not compromise the security of computers that access and present the media described in a model or program. RBML models are inherently secure because they can be transmitted over the Internet in the form of an ASCII text files. For example, one common use of an RBML model is to embed an animation in a Web page. Computers on the Internet can retrieve and view the animation represented as an RBML model using the Internet Browser to fetch the model from a remote server and the viewer to initiate presentation of the animation. The RBML model, if an ASCII text form, cannot corrupt computers that access it because it does not include executable code that impacts computer resources such as instructions to write to the computer's memory. In contrast, however, an imperative program representing a similar animation can potentially impact security because it is likely to have executable code that manipulates memory. Thus, RBML models are more secure than other proposed formats for representing integrated media and interactive animation that are based on imperative programming approaches.

Figure 8B:
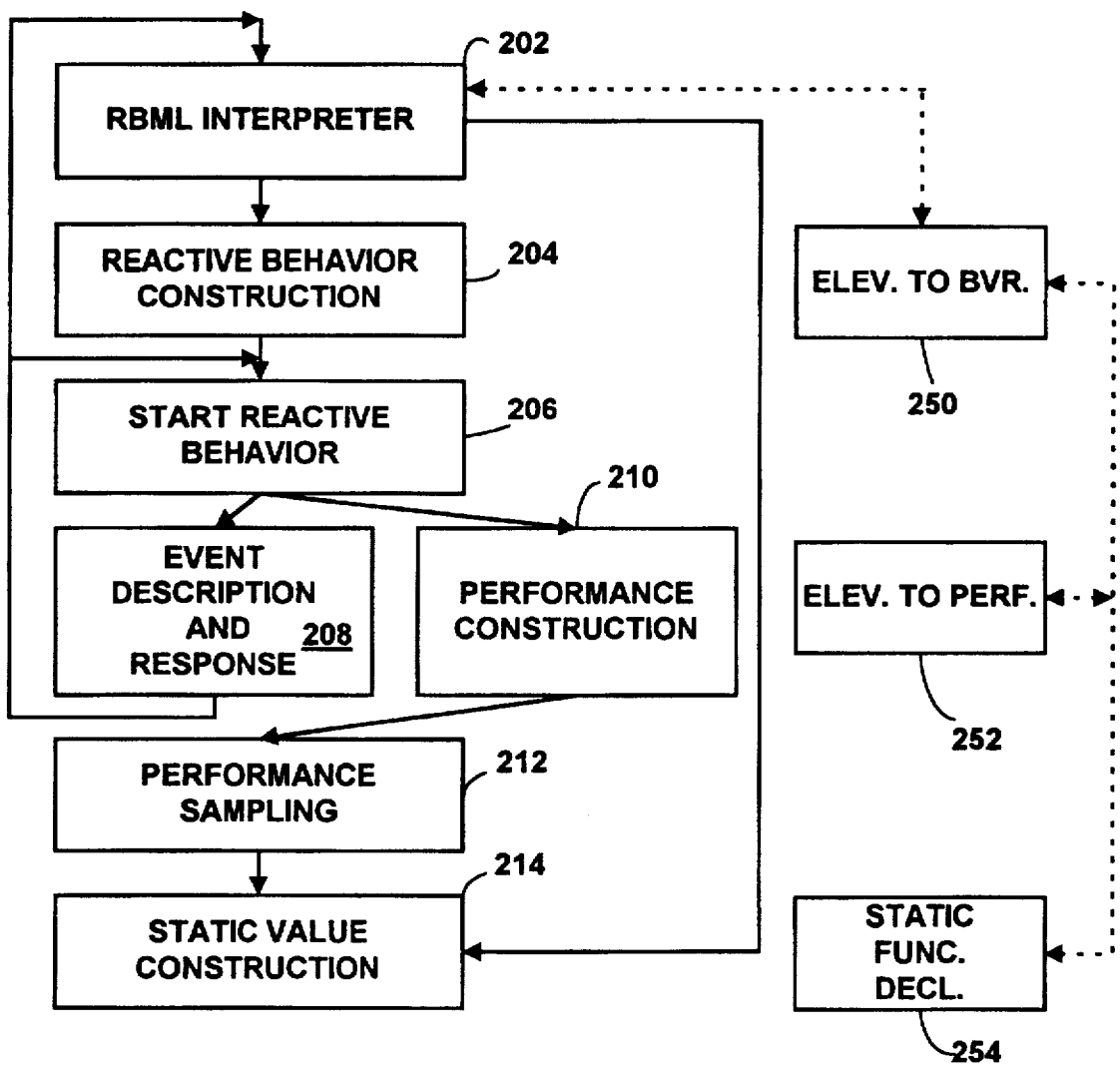
FIG. 8B is a functional block diagram illustrating elevation in the RBML engine of FIG. 8A.

FIG. 8B is a functional block diagram of the RBML engine, including functional blocks illustrating elevation in this implementation. As described above, elevation refers to taking functions that operate on static values and generating functions that operate on behavior valued parameters. As shown in FIG. 8B, functions the operate on static values can be elevated to operate on performance or behavior valued parameters. To elevate to a performance, the elevator takes the function declaration (254) and creates a new function (252) that has the same number of arguments but operates on performance valued parameters instead of static values. Similarly, to elevate to a behavior, the elevator takes a function declaration and creates a new function (250) that has the same number of arguments but operates on behavior valued parameters. In one specific implementation, the elevator creates a new function with performance or behavior valued parameters and wraps it with a performance or behavior object. As shown in FIG. 8B, the elevated behaviors can then be understood by the RBML interpreter 202.

Consider as an example static value declarations in a C header file. The elevator in the RBML engine takes the header file and creates elevated versions of the functions listed in it. For example, the elevator can elevate a C function that operates on a number and returns a string by producing a function that operates on a number of type behavior and produces a string of type behavior. This new behavior valued function may be called from within an RBML model.

Figure 9:
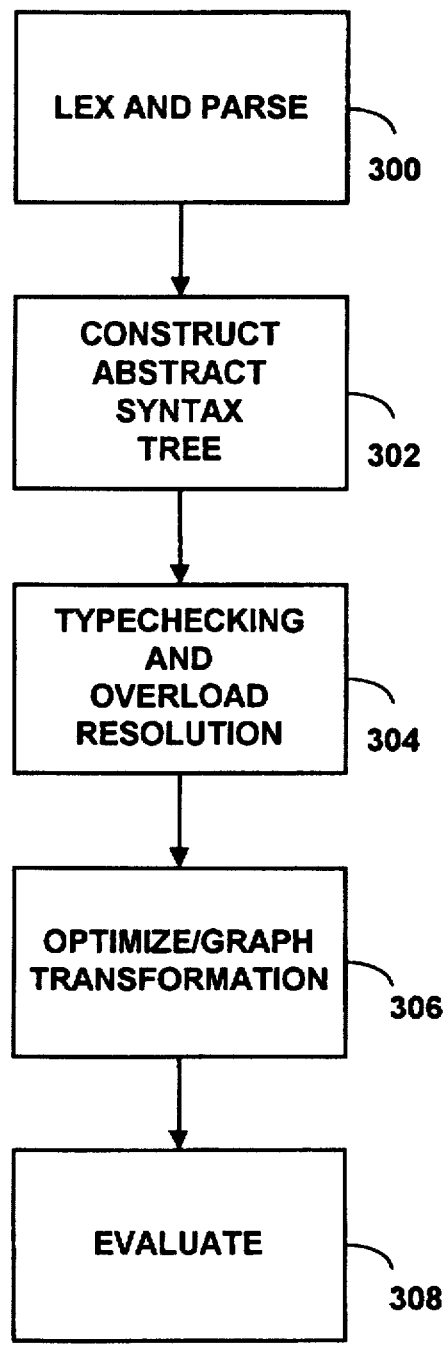
FIG. 9 is a flow diagram illustrating the interpreter in the RBML engine.

FIG. 9 is a flow diagram illustrating the operation of the interpreter in one implementation of the RBML engine. The process begins by performing lexical analysis and parsing the RBML model (300). Next, the interpreter constructs an abstract syntax tree (302). The interpreter then performs typechecking and overload resolution on the syntax tree (304).

In the next step (306), the interpreter performs optimizations on the syntax tree. One form of optimization used in the interpreter is dynamic constant folding. In the creation of a frame of animation, the RBML engine traverses every node in the syntax tree and calls functions on the static values. Since some of these static values often do not change from frame to frame, RBML engine can improve performance by caching results that do not change from frame to frame. The process of identifying and caching non-changing results is referred to as dynamic constant folding.

To support dynamic constant folding, time varying behavior values keep track of whether they are changing. If a behavior is not changing, data about its lack of change is percolated up a functional graph until a non-constant behavior value is encountered. Everything up to that non-constant value is constant, and can thus be evaluated once and have the static value cached in that node.

When the interpreter asks for a value of a node that is non-changing, the cache is returned. When a behavior value transitions from being constant to being animate again, or when it changes to a different constant value, the cache is invalidated.

Another optimization performed by the interpreter is referred to as structure sharing. In structure sharing, multiple instanced nodes are only evaluated once. This form of optimization reduces overhead in evaluating a model because efforts expended in parts of the model can be re-used rather than repeated. Since the RBML engine generates animation by processing values that are free of side-effects, the interpreter can optimize the functional graph using structure sharing as well as other graph optimization techniques.

After completing graph optimization, the RBML engine proceeds to evaluate the RBML model as set forth above (306). While FIG. 9 depicts graph optimization as a step preceding evaluation, it should be understood that the RBML engine can perform additional optimization and analysis throughout the evaluation process.

The reactive behavior model makes very careful use of state and supports operations that are side-effect free. Unlike traditional approaches, an animation in this embodiment does not have to be achieved via side-effecting (modifying state). Rather, it can be achieved conceptually via computing new values from previous ones. This value based semantics lends itself to referential transparency, which permits reducing models into much simpler and more efficient forms through program transformation techniques. Examples of this include constant folding and structure sharing as described above.

Furthermore, the continuous time model and the fact that reactive behaviors represent a complete description of how an entity behaves in relation to time and in reaction to events, lends itself to temporal analysis of the behavior for optimization. One aspect of temporal analysis is exploiting temporal coherency, where it becomes possible to construct a frame by using incremental operations based on the previous frame, rather than generating it from scratch.

Another aspect is the prediction of events before they happen. This lends itself to priming the system in order to achieve a low latency reactivity to the event. Possible techniques for prediction include analysis of rates of change and derivative bounds, and interval arithmetic. For example, when a bullet is approaching a wall, the system can predict the explosion, which allows pre-loading a corresponding texture into main memory. Also there is the possibility of determining that an event is not going to happen for a certain period of time, and hence stop checking for it until that time. For example, if a meteor is approaching the viewing window, and the system determines based on derivative bounds that it is not going to enter for at least five units of time, then the testing for the event will not need to happen until five units of time pass by.

Automatic regulation is a necessity to insure the graceful presentation of common content on varying platforms. This is particularly important for Web content and in light of the wide variations of computer platforms on the Internet. In truly interactive and realistic animation the user should feel like a real time participant of the system. Therefore, the presentation of an interactive animation is a task whose correctness (like synchronization and smoothness) places time-critical needs on the delivery system.

The architecture of the declarative modeling system described above is well-suited for addressing regulation issues. The RBML engine can deal with the fluctuations in load on a particular computer, and the differences in capacity between different computers and still deliver a smooth presentation of the content, albeit at varying levels of quality. Graceful degradation techniques include reducing the frame rate (straight forward given our continuous time model), reducing the spatial resolution, using geometric levels of detail, and using simpler audio filters.

In addition to regulation, the architecture is also especially well-suited for time management, temporal optimizations, and low latency reactivity to events. The RBML approach can factor all these mechanisms into a single engine that resides at the client side, while the content is reduced to the essence of the interactive animation.

All of the advantages of the RBML system also apply to shared spaces, with multi-user participation. The modeling approach in RBML for these shared spaces, with the temporal and event aspects and the disciplined use of state, makes it straight forward to instill the shared experience to different distributed clients with their own viewers and with appropriate regulation.

RBML Reference

Expressions and Declarations

RBML has expression forms and two forms for declaring identifiers. This section describes these forms. The power of RBML comes from the underlying model which includes time varying values and reactivity, and a rich set of media types. These are described in subsequent sections.

Literal and Constructor Expressions

Associated with most types in RBML is a literal or constructor form. Examples include "17", which represents a literal number, and "[1, 2, 3]", which uses the constructor form for lists to build a list of numbers. The allowable constructor forms are defined below in the sections defining each type.

Variable Expressions

An identifier in RBML is an arbitrarily long string of alpha-numeric characters beginning with a letter. Identifiers are case sensitive and there are some keywords that may not be used as identifiers. Variables in RBML are statically scoped.

Application Expressions

An expression of the form expression, expression$_2$ is an expression and represents the value of applying the function value of expression$_1$ to the value of expression$_2$. RBML is strict; that is, it obeys call by value semantics for argument evaluation. The order of evaluation of arguments is not specified. Application associates left; for example, f(x)(y) equates to (f(x))(y).

Parenthetical Expressions

The precedences of various operators in RBML is listed in at the end of this document, in the "RBML Precedence Table" section. Parentheses may be used to group expressions and override the precedences of operators. Parentheses are also useful for improving the readability and presentation of RBML models.

If Expressions

A construct of the form if expression$_1$ then expression$_2$ else expression$_3$ is an expression. It represents the value computed by evaluating the boolean test of expression$_1$ and selecting expression$_2$ or expression$_3$ depending upon the true value of expression$_1$. The types of the two branches of the if expression are required to match (or unify).

There is no corresponding if-then statement; all if statements have both branches. Since the RBML is functional (operations do not have side effects), such one-armed if statements would not be very useful.

Let Expressions

A construct of the form

```
let
    declaration₁;
    .
    .
    .
        declarationₙ[;]
in
    expression
``` is a let-expression. It represents the value of an expression when evaluated in a context that includes the bindings for declaration$_1$-declaration$_n$. The let expression is used to introduce a local scope. The declarations are evaluated simultaneously. The names are in scope of the right hand sides of the declarations allowing for forward declarations and mutual recursion automatically. All of the declared identifiers are required to be distinct. The scope of declarations is limited to the let expression itself.

Declarations

The simplest declarations just declare an identifier to have a value, identifier=expression or declare a function:

identifier(identifier, ... , identifier)=expression

For example, a function declaration looks like

```
swizzle(seed) =
    if seed = 1 then
        1
    else if odd (seed) then
        swizzle (seed*3+1) +seed
    else
        swizzle (seed/2) +seed
```

This declares a function, swizzle, that takes one formal argument, seed. The function is recursive. All function declarations are assumed to be recursive. Using the name of the function in the expression on the right hand side of the equal sign refers to the function being declared.

A variable declaration would look like:

swizit=swizzle(27)

This declares the variable swizit to be the value of evaluating the expression swizzle(27). We can illustrate the scoping in let expressions by combining these declarations along with a declaration for the predicate odd used in the declaration of swizzle:

```
let
    swizzle(seed) =
        if seed=1 then
            1
        else if odd (seed) then
            swizzle (seed*3+1) +seed
        else
            swizzle (seed/2) +seed;
    odd(i) = (mod(i,2) = 1);
    swizit = swizzle(27)
in
    swizit
```

Notice that the declaration for odd came after the use in the declaration of swizzle. Since all of the declarations within a let expression are assumed to be mutually recursive this is legal (although for readability and since these are not really mutually recursive, odd would normally come first).

Within the scope of the let expression, three identifiers are declared, swizzle, odd, and swizit. Outside of this expression, these declarations are not available. The value of the let expression is the value of swizit: 101440.

In addition to these simple forms of variable and function declarations, it is also possible to use pattern matching to specify destructing of values within a declaration.

Basic Types

RBML includes a very powerful and useful type system. Each expression and declaration in RBML is given a type by the user, or one is inferred for it by the system. Consider the following example declaration:

successor(nat)=nat+1

RBML would assign successor the type numberg->number meaning that it will map any value of type number to another value of type number. This typing is strong in the sense that RBML will catch all type errors during authoring. It is also convenient; the user did not have to explicitly give the type—the system inferred it. Finally, the types are polymorphic, meaning that a given type may stand for many different type instances. Consider the following declaration:

nada(val)=val

When applied, nada will return its actual argument unchanged. Thus nada(3) evaluates to the number 3 and nada("hello") evaluates to the string "hello". The type that RBML infers for nada would be polymorphic: $\alpha \rightarrow \alpha$. Here $\alpha$ is a type identifier and may be replaced (everywhere uniformly) to create an instance of a polymorphic type. Thus, number->number is an instance of $\alpha \rightarrow \alpha$, and so is string->string. Note that number->string is not an instance since one $\alpha$ was replaced by a number and the other by a string (not uniformly). If a polymophic type contains more than one type identifier, for example, α–>β, then each identifier may be replaced separately. Thus, number–>β,α–>string, number–>string, number–>number, and y–>string are all instances of the polymorphic type α–>β.

Every expression and declaration in RBML is assigned a type by the system using a standard Milner-Damas polymorphic type-checker. Except to improve exposition and occasionally to resolve ambiguity with an overloaded operator, it is not necessary for the programmer to explicitly give types. An expression may be qualified with a type using the following syntax:

expression: type-expression

For example, the following syntax may be used to restrict nada to a particular type (desirable, for clarity):

nada(val: string)=val

This will assign nada the monomorphic type string–>string.

The following sections define the basic types for RBML and list their constructor forms and functions. Later, sections define the types for reactivity and for modeling types (geometry, images, and associated types).

The Unit Type

Type unit

The unit type is a trivial type containing only one member. This type is often used for functions that take or return uninteresting data, similar to the way that the void type is used in C++ programs.

Constructors ()

The unique member of the unit type, pronounced "trivial".

The Function Type

Type type–>type

The function type α–>β represents mappings from type α to type β. Functions in RBML may be higher-order, meaning that a function can take another function as an argument, or return a function as its result. For example, a function, f, might have type (number–>number)–>number. This means that f may be applied to a function (with type number–>number), and will produce a number as the result. Another function, g, might have type number–>(number–>number). This means that g will take a number as an argument, and produce a function (with type number–>number) as its result.

Constructors function pattern . expression

This constructor is used to create anonymous function values. The pattern part of this will be described in section 0 but may be thought of as the list for formals. For example, the declaration f (x,y)=x*y+1 may be thought of as an abbreviation for:

f=function (x,y).x*y+1

Functions

Function declarations are just value declarations where the value is a function value.

infix o: (α–>β) * (α–>γ)–>(α–>γ)

The expression f o g is the composition of the functions f and g. The notation "infix o" means that o is an infix operator (like the familiar+in 14+3). The value of (f o g)(x) is f(g(x)). Note that o has a type like a higher-order function; in fact it takes two functions as arguments and returns a function as its result. Its type may also be written as ((α–>β) * (β–>γ))–>(α–>γ) since * has higher precedence than–>in RBML types.

The Product Type

Type type * type

The product type α*β represents pairs of elements (e1, e2) where e1 has type α and e2 has type β.

Constructors expression, expression

The pairing constructor is just a comma. The precedence of the comma is extremely low in RBML, so it is usually desirable (and visually clearer) to write pairing with parentheses: (3,"hello").

The pairing operator associates to the right. Thus, (3,"hello", 17) is the same as (3, ("hello", 17)). It is a pair, the second element of which is also a pair.

Functions first: α*β–>α

The first function computes the first element of a pair.

second: α*β–>β

The second function computes the second element of a pair.

The List Type

Type

α list

The type α list may be understood as a list (or finite sequence). Each element is of type α. For example, number list is a list of numbers, and (string list) list is a list where each element is a list of strings.

Constructors

[expression-list]

A list of expressions (zero or more) separated by commas. For example, [] is the null list (of type a list) and [1,2,3] is a number list.

Functions head: α list–>α

The head(list) function is the first element of the list list. It is illegal to apply head to an empty list.

tail: α list–>α list

The tail(list) function computes a list comprising all but the first element of the original list (it is illegal to apply it to an empty list).

infix::: α*α list–>α list

The operator "::" is read as "cons". The expression elt:: list computes a new list formed by prepending ("cons'ing") elt to list.

empty: α list–>boolean

The empty(list) function is true if and only if list is an empty list.

length: α list–>number

The length(list) function computes the length of the list.

map: (α–>β) * (α list)–>β list

The map(fun, list) function computes a list by applying fun to each element of list.

---
reduce: α list * β * (α * β -> β) -> β
 The reduce([e₁,...,eₙ], base, fun) function computes:
  fun (e1, fun(e2, fun(▓, fun(en-1, fun(en, base))▓)))
nth: α list * number -> α

---

The nth(list, n) function computes the nth element of a list, where the first element of the list is 1.

The Boolean Type
Type
boolean

The boolean type represents true and false values in RBML.
Constructors
true
false
Functions
infix and: boolean * boolean–>boolean
infix or: boolean * boolean–>boolean
infix not: boolean–>boolean
infix=: α* α–>boolean Equality may be used to compare any two values with the same type. Equality in RBML is structural: pairs are equal if each side of the pair is equal; lists are equal if the lengths are the same and if the corresponding elements of each list are equal. Equality applied to functions is not defined (since it is not theoretically possible to determine if two functions are the same).

infix <>: α* α–>boolean

The expression x<>y is true if x is not equal to y.
The Number Type
Type
number

Number is the type of numbers in RBML. RBML does not distinguish between "fixed point" and "floating point" numbers, they are just numbers. The implementation will choose an appropriate representation.
Constructors
number-literal The number-literal constructor is any sequence of characters satisfying the following regular expression:

digit+('.'infix+: number * number–>number digit*)? (['e' E'] ['+'-]?digit+)?
time A time-varying number representing the (local) time of a behavior. This important constructor is the basis for many interesting time-varying behaviors.
random A pseudo-random number in [0,1] that is time-varying. All instances of random that start at the same (global) time have the same time-varying value.
pi A constant number representing $\pi$.
Functions
infix *: number * number–>number
infix -: number * number–>number
infix /: number * number–>number Division by zero is an error.
prefix -: number–>number The notation "prefix -" means that "-" is also a unary operator (for example, -x where x has type number).
prefix +: number–>number The prefix operator+does not change the value of a number.

infix <: number * number–>boolean
infix <=: number * number–>boolean
infix >: number * number–>boolean
infix >=: number * number–>boolean
abs: number–>number Absolute value.
sqrt: number–>number Square root.
mod: number*number–>number Arithmetic modulus.
ceiling: number–>number
floor: number–>number
round: number–>number
radiansToDegrees: number–>number
degreesToRadians: number–>number
asin: number–>number
acos: number–>number
atan: number * number–>number The atan(h, w) function returns the arctangent of h/w in radians.
atan: number–>number
cos: number–>number Cosine of radians.
sin: number–>number Sine of radians.
tan: number–>number Tangent of radians.
infix ^: number * number–>number The x^y function computes $x^y$.
exp: number–>number.

The exp(x) function computes $e^x$.
ln: number–>number

The ln(x) function computes the natural logarithm of x.
log10: number–>number

The log10(x) function computes the base 10 logarithm of x.
seededRandom: number–>number Pseudo-random behavior is parameterized by a random seed. SeededRandom returns x in [0, 1], implicitly parameterized by time.

Reactive Behaviors

Recall that all values in RBML are (potentially) time-varying. Variance is achieved either by parameterizing with time explicitly, by inputs such as mouse motion, or by reactivity. This section defines reactivity and the constructs used to build reactive behaviors.

Events and Reactivity

An event is something that can trigger a discrete change in a behavior. In addition to marking the occurrence of an event at a particular time, an event may also produce data. An a event produces, at the time of the event, some data of type α that can be used as new behavior after the event. Events are constructed from one of the following:

System Events

System events represent user input events. For example,
leftButtonPress: unit event
rightButtonPress: unit event
keyPress: character event Boolean Events The event corresponding to a boolean behavior occurs the first time after the event starts that the boolean is true (that is, it may be true initially, or on the first false to true transition if not true initially). The predicate function is used to construct an event from a boolean behavior.

Handler Events

More complex events may be constructed from other events. If e is an α event and f is a function with type α−>β, then e−>f is a β event. Intuitively, it means wait for event e, and then take the data produced by that event and run the function f on it to produce something with type β. This event happens at the same time that e does, and produces the new piece of data.

Alternative Events

If e and e' are α events, then e|e' is an a event that means, intuitively, choose whichever event, e or e', happens first, and return the corresponding data for it. If e and e' happen at the same time, it is undefined which will be chosen.

Filtered Events

If e is an a event, and f is a function that maps a values to booleans, then suchThat(e, p) is an α event that allows only occurrences of e whose data satisfies the predicate p.

Until Construct

The until construct is used to create reactive behaviors. If b is an α behavior and e an α event, then b until e is a reactive behavior with type a behavior. Intuitively, it means the behavior is b until the event e happens, and then becomes what the event data is. Below is a simple example. The color is red until the mouse button is pressed. Then the color is green:

red until leftButtonPress=>green

Snapshot Construct

The snapshot construct may be used to make a time varying behavior into a static one (i.e., no longer varying with time). This is useful when one wishes to record the instantaneous value of a time varying behavior for some other use. For example, 0 until snapshot(leftButtonPress,
xComponent(mousePosition))

is the static behavior 0 until the left mouse button is pressed. It then becomes the static value of the x coordinate of the mouse position at the time of the press. The behavior 0 until leftButtonPress=>xComponent(mousePosition)

is different in that it produces a behavior that continues to vary with time and track the x coordinate of the mouse after the button event occurs.

Terminating a Behavior

Behaviors may terminate. The end construct is of type a (any type) and it means immediately terminate the behavior. For example, b=time until leftButtonPress=>end is a behavior that varies with time until the left button press event, in which case it terminates. If a behavior is defined in terms of other behaviors and one of those behaviors terminates, then the behavior itself terminates. Consider the following:

b'=f(b,3)

If behavior b terminates, then b' terminates at the same time. The construct done is a unit event that can be used to detect that a behavior has terminated and react accordingly. Consider the following:

---
repeat(b) =
b until
done => repeat(b)
---

This function takes a behavior b and runs it until it terminates. Then it starts it again. (This function is actually built into RBML.)

Behaviors and Time

To improve modularity, all behaviors are defined to begin at local time zero. Consider the following:

b until e=>b'

Assume b is the main entry point behavior of the RBML program. When b is performed, the system begins at global time tg. This is, by definition, time=0 for b. The event e occurs when it happens the first time after tg (the first time after local time 0 relative to b). Suppose this is at time te (as specified in global time). Then at global time te, b' is performed starting with its local time 0. So according to global time, this behavior was b until te and then became b'. As for b, its time went from local time 0 to local time (te-tg). Then b' was started with its local time 0 (assuming that no other time transformations were in effect).

Here is a simple example. Consider the following behavior:

---
green until time = 2 =>
blue until time = 1 =>
red
---

This behavior is green for 2 seconds, blue for 1 second, and then red. The timeTransform construct may be used to change the interpretation of local time. The function has the following type:

timeTransform: α* number−>α

It uses the number to redefine how local time is interpreted within a behavior. Consider the following:

doublespeed=time*2;
b=playVideo(video);
doublevideo=timeTransform(b, doublespeed)

This will result in a behavior that plays the video at twice its natural speed. From the perspective of global time, each 1 second interval corresponds to 2 seconds of local time. The effects of time transformation are cumulative. For example:

timeTransform(doubleVideo, doublespeed)

This ends up with a behavior that plays at 4 times the original video speed. To be well defined, the number, n, argument for the time transform will be required to satisfy two rules:

u Monotone: For all times t0 and t1, if t0<t1 then n at time to <n at time t1.

u Non-negative: For all times t, tt at t is non-negative.

Monotonicity is required to make event reaction sensible (event transitions cannot be undone). Non-negative is required to prevent trying to define a behavior before local time 0 (because it may not make sense to sample a behavior like a video before local zero).

Certain behaviors, principally those defined by system or user input devices, may not be transformed in time in the same way that synthetic behaviors are. Such devices ignore (or conceptually invert) the user-defined time transformation when being sampled.

The following subsections define the types and operators used in constructing reactive values.

Events
Type
α event
Constructors
done: unit event
Functions
The done constructor detects the termination of a behavior.
infix |: a event * α event−>a event e1|e2 is an alternative event. The first of the two events is chosen, and the data associated with that event becomes the data for the alternative event.

predicate: boolean–>unit event predicate(b) turns a boolean value into an event with trivial (unit) data. The event occurs the first time after local time 0 that the predicate b is true.

infix =>: a event * (α->β)->β event e=>h is a handler event. It occurs the same time that e does, and returns as the function h applied to the data produced by e.

infix =>: a event *β->β event

This second form of e=>b is a syntactic convenience, and valid only when b is not a function. It is roughly equivalent to e=>function x.b and is useful when the handler does not need the value of the data produced by the event. This is a special form and does not immediately evaluate the second argument.

suchThat: α event * (α–>boolean)->α event suchThat(e, p) is a filter event that occurs when e does producing the data that e would, but only if the predicate, p, is true on that data.

andEvent: α event * β event->α*β event andEvent(e1,e2) is occurs when e1 and e2 are simultaneously true. The data returned is the pair of data from e1 and e2, respectively.

snapshot: α* unit event->α event snapshot(b, e) creates a new event that happens at the same time as the e event, and associates a static snapshot of the b behavior with the event. When the e event occurs, the b behavior is sampled at that time and a new event with the static sampled value of b associated with it is created. Snapshot is a special form that does not immediately evaluate the second argument.

Reactivity
Constructors
end: α end causes the behavior to finish immediately.

infix until: α* α event->α

The expression b until e is equal b until the event e occurs and then becomes equal to the value, b', that e produced.

repeat: α->α repeat(b) is equal to b until b ends and then restarts with b at that time.

Time
Functions:

timeTransform: α* number->α timeTransform(b, timeTrans) adjusts the local time line for behavior b to follow the (time-varying) number timeTrans. For example, timeTrans(b, time*2) makes a behavior that runs twice as fast as b would. Only special number behaviors are allowed as time transformations. In particular, they must be non-negative and strictly monotonically increasing. The first restriction preserves the requirement that the time of a behavior is positive. Monotonicity is required because time (and reaction) cannot be stopped or reversed.

Modeling Types

This section describes a broad range of types and functions that are useful for manipulating media types. This includes types for 2D images, 3D geometry, 2 and 3D vectors, points, cameras, colors, etc.

RBML uses the following conventions:

Time is specified in seconds.

Angles are specified in radians.

Distances, where relevant, are specified in meters (for instance, for sizes of images).

We use a right-handed coordinate system with positive x to the right, positive y up, and negative z into the screen.

2D Points
Type
Constructors
point2
origin2: point2
Functions
point2Xy: number * number->point2
point2Polar: number * number->point2
point2Polar(theta, rho)
addvector: point2* vector2->point2
subtractVector: point2* vector2->point2
infix -: point2* point2->vector2
distance: vector2* vector2->number
distanceSquared: vector2* vector2->number
xComponent: point2->number
ycomponent: point2->number
apply: transform2* point2->point2
thetaComponent: point2->number
phiComponent: point2->number
2D Vectors
Type
vector2
Constructors
xVector2: vector2
yVector2: vector2
zeroVector2: vector2
Functions
vector2Xy: number * number->vector2
vector2Polar: number * number->vector2
vector2Polar(theta, rho)
normal: vector2->vector2
length: vector2->number
lengthsquared: vector2->number
infix +: vector2* vector2->vector2
infix –: vector2* vector2->vector2
scaleVector2: vector2* number->vector2
dot: vector2* vector2->number
xComponent: vector2->number
yComponent: vector2->number
apply: transform2* vector2->vector2
thetaComponent: vector2->number
rhoComponent: vector2->number
Type
2D Transformations
transform2

2D transformations representing a mapping between 2D-space and 2D-space, and are used to transform various 2D entities, including point2, vector2, and image, all via the overloaded apply function listed in the relevant sections.

Constructors
identityTransform2: transform2
Functions
translate: number * number->transform2
translate: vector2->transform2
scale: number * number->transform2
scale: vector2->transform2
scale2: number->transform2// uniform scale
rotate2: number->transform2// rotate n radians ccw
shear2: number->transform2 transform3x2: number * number * number * number * number * number->transform2
inverse: transform2->transform2
isSingular: transform2->boolean Images Type image A value of type image is a spatially continuous image behavior of infinite spatial extent. Operations on it include application of 2D transforms and opacity, and overlaying images. Continuous images are constructed by importing bitmap files, projecting 3D geometry, or by rendering text into an image.

Constructors emptyimage: image
import(pathname.[bmp|jpeg|gif]): image * vector2 * number where image is the imported image, vector2 is the size of the imported image in meters, and number is the resolution of the image in pixels per meter.

Functions renderedImage: geometry * camera->image renderedImage(geometry, viewingcamera) is the primary 3D to 2D interface. The viewingCamera parameter determines the projection by which the geometry will be imaged. The resultant image is spatially infinite, and the camera performs no cropping. Cropping, if desired, can be achieved via the crop function below.

infix over: image * image->image renderedImage(top, bottom) produces a new image with top overlaid above bottom.

opacity2: number->(image->image)

opacity2(value)(img), given a value from 0.0 to 1.0, creates a new image identical to img, but (value * 100) percent opaque. These compose multiplicatively, thus opacity2(0.5)(opacity2(0.2)(myopaqueImg) results in an image with opacity of 0.1 (thus it is 90% transparent).

crop: point2* point2->(image->image)

crop(min, max)(img) creates an image identical to img inside of the box defined by min and max, and transparent outside of this box.

apply: transform2* image->image

Composite 2.5D Images

Type montage

A montage is a set of images with associated depth values. Montages are useful for creating multi-layered, image-based (cel) animation.

Constructors emptyMontage

Functions imageMontage: image * number->montage imageMontage(image, depth) builds an 2.5D image set with a single image at depth.

infix union: montage * montage->montage union combines the contents of two image sets into a single collection.

renderedImage: montage->image renderedMontage converts the set of images and depths encapsulated in a montage into a flattened image. Images elements with larger depths will be layered underneath.

3D Points

Type point3

Constructors origin3: point3

Functions point3Xyz: number * number * number->point3
point3Spherical: number * number * number->point3
point3Spherical(theta, phi, rho)
infix -: point3* point3->vector3
distance: point3* point3->number
apply: transform3* vector3->vector3
xComponent: point3->number
yComponent: point3->number
zComponent: point3->number
thetaComponent: point3->number
phicomponent: point3->number
rhocomponent: point3->number 3D Vectors Type vector3

Direction and magnitude.

Constructors xVector3: vector3
yVector3: vector3
zVector3: vector3
zeroVector3: vector3

Functions vector3Xyz: number * number * number->vector3
vector3Spherical: number * number * number->vector3
vector3Spherical(theta, phi, rho)
normal: vector3->vector3
length: vector3->number
lengthSquared: vector3->number
infix +: vector3* vector3->vector3
infix -: vector3* vector3->vector3
scaleVector3: vector3* number->vector3
dot: vector3* vector3->number
cross: vector3* vector3->vector3
apply: transform3* vector3->vector3
xComponent: vector3->number
yComponent: vector3->number
zComponent: vector3->number
thetaComponent: vector3->number
phicomponent: vector3->number
rhocomponent: vector3->number 3D Transformations Type transform3

3D transformations representing a mapping between 3D-space and 3D-space, and are used to transform various 3D entities, including point3, vector3, geometry, microphone, and camera, all via the overloaded apply function listed in the relevant sections.

Constructors identityTransform3

Functions:

translateXyz: number * number * number->transform3
translate: vector3->transform3
scale: number * number * number->transform3
scale: vector3->transform3
scale3: number->transform3// uniform scale
rotate: vector3* number->transform3

Construct a rotation number radians about the axis specified by the provided vector.

xyShear: number->transform3
zyShear: number->transform3
xzShear: number->transform3 transform4×4: number * number * number * number * number * number * number * number *number * number * number * number * number * number * number–>transform3 lookAtFrom: point3* point3* vector3–>transform3 lookAtFrom(from, to, up) creates a transform which, when applied to an object centered at the origin, with +Y up and directed toward −Z, moves the object to from, pointing towards to, with its up direction as close to up as possible. This is quite useful for placing cameras, lights, and other geometries.

inverse: transform3–>transform3
    isSingular: transform3–>boolean

3D Geometry

Type geometry

A value of type geometry is a spatially continuous behavior of infinite spatial extent in three dimensions. A geometry value is constructed by importing other geometry formats (such as VRML), applying modeling transformations, material properties, aggregating multiple geometries, positioning sound in 3D, etc.

Constructors emptyGeometry: geometry import(filename.[wrl]): geometry * point3* point3 where geometry is the result of importing the specified file, and the two points returned are the minimum and maximum extents of the tightest axis-aligned, rectangular bounding volume containing the geometry.

Functions infix union: geometry * geometry–>geometry union aggregates two geometries into their geometric union.

soundSource3: sound–>geometry soundSource3 allows sounds to be embedded into geometry. It creates a geometry with the specified sound positioned at the local coordinate system origin. The resultant geometry may be transformed in space, and has no visible presence when rendered. The function renderedSound, described in the Sound section below, takes a geometry and a microphone, and creates a sound by spatializing all of the sounds embedded into that geometry with respect to the microphone.

apply: transform3* geometry–>geometry
specularExponent: number–>(geometry–>geometry)
opacity3: number–>(geometry–>geometry)

opacity3(value)(geo), given a value from 0.0 to 1.0, creates a new geometry identical to geo, but (value * 100) percent opaque. These compose multiplicatively, thus opacity3(0.5)(opacity3(0.2)(myopaqueGeo) results in a geometry with opacity of 0.1 (thus it is 90% transparent).

texture: image–>(geometry–>geometry)

The texture function is the means by which texture mapping onto geometry is specified. The coordinates of the image are mapped onto the texture map coordinates associated with the vertices of the primitive geometries comprising the geometry being mapped, resulting in textured geometry. If the primitive geometries have no texture coordinates, texturing is ignored. As with the Lambertian shading parameters, the outermost applied texture "wins".

The following functions create "light" geometries, all of which have no visible appearance themselves, but they do cast light onto other objects they are aggregated with.

ambientLight: color–>geometry directionalLight: color–>geometry
pointLight: color–>geometry
spotLight: color * number * number * number–>geometry spotLight has arguments color, fullcone, cutoff and exponent.

The following functions allow for attributing geometry with standard Lambertian shading characteristics. The outermost applied attribute "wins", i.e., diffuseColor(red) (diffuseColor(blue)(geo)) results in a red geometry.

diffuseColor: color–>(geometry–>geometry)
ambientColor: color–>(geometry–>geometry)
specularColor: color–>(geometry–>geometry)
emissiveColor: color–>(geometry–>geometry)

Cameras

Type camera

Constructors simplecamera: number–>camera simpleCamera(viewDistance) whose eye-point is at the origin, looking along the +Z axis with +Y up. The viewing plane is Z=viewDistance. (Hither and yon clipping planes are not exposed, but may be determined by the implementation as follows: hither is viewDistance, and yon is determined from implementation-determined bounding volume of geometry being rendered.)

Functions apply: transform3* camera–>camera

Sounds

Type sound

A sound value is constructed via the importation of primitive sounds, via mixing, via rendering of geometry with embedded sounds, and via application of audio attributes, such as gain.

Note that sound is always considered to be single channel. Stereo is supported by constructing two separate sounds.

Certain audio effects can be achieved by using the general time transformation mechanism. For example, both phase shift and rate control can be achieved via time transformation.

Constructors silence import(pathname.[wav|au|aiff]): sound * sound

Importation of a WAV, AU, or AIFF file constructs a pair of sounds, for the left and right channels of the sound. If the imported file is monophonic, then the two returned sounds are identical. When a sound is finished, it terminates, as described in Section 0. Sounds can be looped by using the repeat facility.

Functions infix mix: sound * sound–>sound mix combines two sounds into a single sound, with each component sound contributing equally.

renderedSound: geometry * microphone–>sound renderedSound takes a geometry and a microphone, resulting in an audio rendering of the sounds embedded within the geometry (via soundSource3), with respect to the microphone.

gain: number–>(sound–>sound)

gain multiplicatively adjusts the gain of a sound. Thus, gain(0.3)(gain(5.0)(origSound)) results in a sound 1.5 times as loud as the original sound.

Microphones

Type
microphone
The microphone type represents an audio perceiver in 3D. RBML 1.0 supports simply a microphone that may be spatially transformed via modeling transforms. Future versions will add other attributes to the microphone.
Constructors
Functions
defaultMicrophone
apply: transform3* microphone->microphone
Colors
Type
color
Constructors
red: color
green: color
blue: color
cyan: color
magenta: color
yellow: color
white: color
black: color
Functions
colorRgb: number * number * number->color
colorhsl: number * number * number->color
redComponent: color->number
greenComponent: color->number
blueComponent: color->number
hueComponent: color->number
saturationComponent: color->number
lightnesscomponent: color->number
The Character Type
Type:
char
Constructors
'c'
C is a ASCII character or one of the following escape forms:

| | |
|---|---|
| \n | Newline |
| \t | Tab |
| \' | Apostrophe character |
| \" | Quote character |
| \\ | Backslash character |
| \integer | The ASCII character with this value |

Functions
ord: char->number
Ord(c) is the ASCII code for character c.
chr: number->char
Chr(n) is the ASCII character corresponding to n.
The String Type
Type
string
Constructors
"string-literal"
where string-literal is a sequence of characters or escaped characters.
Functions
infix &: string * string->string
implode: char list->string
explode: string->char list
numberToString: number*number->string
numberToString(num, precision) formats num to a string with precision digits after the decimal point. If precision is zero, then the decimal point is elided. It is illegal for precision to be negative.

Font Families
Type
fontFamily
Constructors
serifProportional: fontFamily
sansSerifProportional: fontFamily
serifMonospaced: fontFamily
Text
Type
text
RBML supports the construction of simply formatted "text", which can then be rendered into an image. RBML 1.0 supports simple scaling, coloring, bold and italic, and choosing from a fixed set of typefaces.
Functions
simpleText: string->text
The text created by simpleText has a default color (black), family (serif proportional), and is neither bold nor italic. It has a nominal scale of 1 point.
textScale: number->(text->text)
textScale composes with other textScales multiplicatively.
textColor: color->(text->text)
textFamily: fontFamily->(text->text)
The outermost application of these functions "wins".
bold: text->text
italic: text->text
renderedimage: text->image*vector
This renderedimage function takes text and returns an image, as well as a size (in meters) of the nontransparent region of the resultant image (it starts at the origin). The resultant image may subsequently be scaled by applying image transformations.
The resultant image is transparent in all places other than where the text is actually rendered.
There are explicitly no alignment operators (align left, right, center, etc.), as these can be achieved by transformation of the resultant image.
Integration, Differentiation and Interpolation
Derivatives, integrals and linear interpolation apply to the following types:

| T | DT |
|---|---|
| number | number |
| point2 | vector2 |
| vector2 | vector2 |
| point3 | vector3 |
| vector3 | vector3 | derivative: T->DT
integral: DT->DT
The table is ambiguous above in situations where a vector is being integrated. To resolve this ambiguity, RBML chooses to integrate a vector into a vector, and not a point.
blendLinear: T * T * number->T
Single User Interactivity
Interaction with a user (user input) is one way in which a behavior value changes over time. For RBML 1.0 models, a very simple user input model for a single user is provided. It provides behaviors that represent the user's mouse and keyboard, and facilities for specifying reaction to picking (pointing to and clicking on) geometry and images.
User Input
The keyboard and mouse of the user are modeled via a number of additional pervasive (library) functions and values in RBML:

leftButtonDown: boolean

This behavior tracks the state of the left button of the mouse.

leftButtonPress: unit event

The leftButtonPress event occurs each time the user presses the left mouse button down.

leftButtonRelease: unit event

The leftButtonRelease event occurs each time the user releases the left mouse button.

rightButtonDown: boolean rightButtonPress: unit event rightButtonRelease: unit event Analogous to the corresponding left button events.

keyDown: character−>boolean keyDown(c) predicate is true if the c key is presently depressed.

keyPress: character event

This event occurs when a key is pressed. It produces the character that was entered as the event data.

keyRelease: character event mousePosition: point2 mousePosition tracks the current position of the mouse in world image coordinates.

Picking Images and Geometry

RBML 1.0 provides a simple model of picking geometry and images within a model. Picking is based upon a continuously probing input device, the user's mouse. The following probe functions take an image (for 2D) and geometry (for 3D), and return events that occur when any ray cast from the assumed eye point of the viewer to the specified image or geometry.

Occlusion is taken into account. That is, probing rays do not pass through a non-transparent part of one image into another image, or through one non-transparent geometry into another (or through to another image).

probe: image−>(point2* vector2) event

The specified image is interpreted as being in local coordinates. The returned event data consists of pointPicked and offset where pointPicked is the static point on the image that was picked, in local coordinates (local to the image) and offset is the 2D vector-valued behavior that tracks the probe as it moves relative to the picked point, also in coordinates local to the specified image.

probe: geometry−>(point3* vector3) event

Similar to the 2D case, the event produces a static point on the geometry where the pick occurred and a vector-valued behavior that tracks the probe as it moves relative to this point. Both return values are local to the specified geometry.

Pattern Matching

This section describes a useful, but somewhat more advanced feature of RBML, the ability to specify declarations using pattern matching. The general syntax for a value declaration is pattern=expression and the general syntax for a function declaration is identifier pattern=expression Patterns may be used to destructure values and specify bindings for (potentially) more than one identifier. The pattern is one of the following forms: ()

This form matches the trivial value, 0, of the type unit.

identifier

This matches any value and effectively binds the value to the identifier in the right hand side of the declaration. All of the identifiers in a pattern must be distinct.

pattern1, pattern2

This form matches a pair value if pattern1and pattern2match the left and right components of the pair. The comma pattern associates right.

(pattern)

This form is used to group pattern syntax for readability and precedence. It matches if pattern matches the value.

pattern: type

Matches the value if pattern does, and constrains the pattern to have particular type.

The following are a few example declarations.

x=3

This declares the identifier x as a variable with value 3.

(x,y)=(4,17)

This pattern matches since the pattern, (x,y), and value, (4,17) are both pairs. The effect is to bind x to 4 and y to 17.

(x,y)=p

This declaration has the effect of matching x to the first component of p (which must be a pair) and y to the second component of p.

(x,y)=3

This declaration is wrong since 3 is not a pair This will be reported as an error.

f()=5

This declares a constant function. The application expression, f(), will always produce the value 5.

g(x)=x+1

This declares a function that takes an argument, x.

h(x,y)=x+y

This declares h to be a function taking a single argument that must be a pair. The function may be applied either as h(3,4) or as h(p) where p is a pair of numbers.

k(x,y,z)=x+y/z

This declares k to be a function taking a single argument that is a pair, and the second component of the pair is also a pair (i.e., int*(int*int)). Because comma in patterns associates right, this form of declaration could also have been written as k(x,(y,z))=x+y/z. An application of k could look like k(1,2,3) or k(1,(2,3)) or k(1,p) where p is a pair, or k(t) where t is a triple of type int*int*int. An application like k((1,2),3) is wrong (since the second component of the pair is not a pair).

Pattern matching may also be used to specify the formals for a function expression. For example, function (x,y). x+y is an anonymous addition function and function (x,y). x returns the first element of a pair.

RBML Models and the Web Browser

This section describes the conventions that must be followed to connect an RBML program to an Web browser for single-user interactive animations. RBML 1.0 programs should contain the following comment as their first source line:

// RBML 1.0 ASCII

An RBML program consists of a list of top-level declarations. An external entry point will be a declaration with type geometry or image*sound*sound. These are the only behaviors that may be indexed via a URL. The former will cause the browser to enable a 3D navigational user interface to allow the user to navigate the geometry, and the sounds embedded in the geometry will be rendered. The latter form allows the creator of the model to use their own camera, and to directly specify the sounds to play to the left and right speakers.

Embedding and Hyperlinking To RBML

To specify a hyperlink from an HTML document to an RBML model, one uses an anchor syntax like:

```
<a href="//http://www.microsoft.com/foo.rbml#myModel">
```

This has the effect of creating an active link to the model myModel in the file foo.rbml on www.microsoft.com. The model myModel must have type geometry or image*sound*sound. The latter is for images with stereo sound. Geometries may contain sound directly. When the text is selected, an RBML 1.0 capable viewer will jump to the RBML model and start running it (at local time 0) and displaying the results and playing the sounds.

It is also possible to embed an RBML model within an HTML page. To do so, one uses a syntax like:

```
<embed clsid=RBML.RbmlView1 width=300 height=300
    props="URL=http://www.microsoft.com/
    foo.rbml#myModel "
```

This has the effect of instructing the viewer to display the model in a window within the HTML page. The height and width are specified in Pixels to be consistent with other embedding for HTML.

Hyperlinking from RBML

The hyperlinking interfaces are very basic:

hyperlink3: string->(geometry->geometry)

hyperlink2: string->(image->image)

These act as attributers for geometry and image. For example:

im2=hyperlink2(http://www.microsoft.com")(im1)

The variable im2 is now an image that when selected will be noticed by the browser, causing a jump to the specified URL. Note that the URL can be any valid Web content type, not just RBML.

For RBML 1.0, we make the policy decision that when the browser goes "back" to the RBML model after jumping to a hyperlink, the model is started over, just as if "Reload" is pressed. We do not save environment and continue where we left off.

Viewer Information

The following information is available to the model in RBML 1.0:

viewerResolution: number

The resolution of the view in pixels per meter. This number will generally only be an approximation, as, among other things, monitor size varies.

viewerDimensions: vector2

The dimensions of the view in meters.

RBML Grammar and Lexical Conventions

Identifiers

An RBML identifier is an alphanumeric string beginning with a letter. Identifiers are case sensitive. No a priori length limit is imposed.

Type identifiers

A type identifier is an apostrophe, ', followed by an identifier. In typeset documentation, including this one, Greek letters will often be used instead of the ASCII syntax for type identifiers to improve readability.

Comments

Comments are of the form /* ... */ or //... where the first form encloses any characters other than */ and the latter form ignores everything until the end of line. Nested comments are handled correctly.

White Space

Spaces, tabs, carriage-return, line-feed, and comments are considered white space and are ignored other than as token separators.

RBML Keywords

The following are the keywords of RBML. These words are reserved and may not be used as identifiers:

until
and
else
event
function
if
import
in
let
list
mix
not
o
or
over
then
union

RBML Precedence Table

| Operator | Associativity |
| --- | --- |
| -> | Right |
| *(product type) | Left |
| list event | Non Associative |
| , | Right |
| .(dot in function) else in | Non Associative |
| until | Right |
| |(or event) | Left |
| =>(event handler) | Left |
| o union over mix | Left |
| ::(list cons) | Right |
| or | Left |
| and | Left |
| not | Non Associative |
| =<<=>>=<> | Left |
| +-(binary) & | Left |
| */ | Left |
| ^ | Right |
| +-(unary) | Non Associative |
| :(type qualification) | Non Associative |

RBML Syntax

```
program:
declarations
| epsilon
declarations:
declaration
| declaration;
| declaration ; declarations
declaration:
```

-continued

```
pattern = commaexpression
| identifier pattern = commaexpression
pattern:
        ()
    | identifier
    | pattern , pattern
    | (pattern)
    | pattern: typeexp
expressionlist:
    nonemptyexpressionlist
    | epsilon
nonemptyexpressionlist:
    expression , nonemptyexpressionlist
    | expression
commaexpression:
    expression , commaexpression
    | expression
expression:
        if expression then expression else expression
    | let declarations in expression
    | function pattern . expression
    | expression binaryoperator expression
    | unaryoperator expression
    | applyterm
binaryoperator:
    + | - | * | / | ^ | = | > | >= | < | <= | :: | & | and | or | until ||| union | over | mix | o
unaryoperator:
    + | - | not
applyterm:
    applyterm term
    | term
term:
        numberliteral
        | characterliteral
        | stringliteral
    | identifier
    | ()
    | (commaexpression)
    | [expressionlist]
    | term: typeexp
typeexp:
        typeidentifier
    | identifier
    | typeexp * typeexp
    | typeexp -> typeexp
    | typeexp identfier
    | (typeexp)
epsilon:
    /* empty */
```

Overview of Media Supported

The RBML Reference Manual describes the complete set of types and operations supported by RBML 1.0. This section provides a brief overview. (All of the types and operations are time varying.)

- u 3-D geometry. Supports importation, aggregation, transformation, and texture mapping of interactive animated images, manipulation of color and opacity, and embedding of sounds and lights.
- u Images. Provides infinite resolution and extent images. Supports importation, 2-D transformation, opacity manipulation, and overlaying. Also supports rendering an image from a 3-D model (requires a camera) and rendering an image out of rich text. Even geometrical and image renderings have infinite resolution and extent, since discretization and cropping are left to the display step, which is always left implicit.
- u Sound. Rudimentary support for importing, modifying, and mixing sounds. Also, support for rendering a sound out of a 3-D model, given a microphone. Independent of sampling rate and precision.
- u Montages. Composite 2.5-D images, supporting convenient, multi-layered cel animation.
- u 2-D and 3-D points and vectors. Operations include vector/vector and point/vector addition, point subtraction, scalar/vector multiplication, and dot and cross products. Also supports construction and deconstruction in rectangular and polar/spherical coordinates.
- u 2-D and 3-D transforms. Supports translate, scale, rotate, shear, identity, composition, inversion, and matrix-based construction. Can be extended to nonlinear deformations, and so forth.
- u Colors. Various constants, construction and deconstruction in RGB and HSL color spaces.
- u Text. Rudimentary support for formatted text, with color, font family, optional bold, and italic. If there are Internet standards for rich text, then we would like to support importation as well.
- u Miscellaneous. Support for numbers, characters, and strings.

Embracing Existing Formats

There is an enormous amount of raw material available today, both commercially and freely on the Internet, that can be used as a starting point for constructing interactive animations. This material is in the form of files in many different formats representing geometry, images, video, sound, animation, motion paths, and so forth. RBML works with these representations directly, rather than requiring authors to create raw material specifically for RBML, or even converting existing material into a new format.

For our solar system, we start with a VRML 1.1 model of a unit sphere and a GIF-formatted earth texture. We import this content into RBML by means of import, and name the results for later use.

sphere=import("sphere.wrl");
 earthMap=import("earth-map.gif");

Compositional Specification

As mentioned above, composition is the building-block style of using existing models to make new models, combining the resulting models to make more new models, and so on.

To start building our earth geometry, we apply the earth texture to this earth sphere. We begin by making a texture:
 earthTexture=texture(earthMap);

We then apply the texture to the unit sphere:
 unitEarth=earthTexture(sphere);

In our solar system, we will take the Sun's radius to be one unit, and the earth's to be half as big. Given the texture-mapped unit sphere, we first make a transform that scales by one half, uniformly.
 halfscale=scale3(0.5);

Now we can form the reduced sphere by applying the halfscale transform to the texture-mapped unit sphere:
 earth=apply(halfscale, unitEarth);

Next we want to reposition the earth, so that it will apart from the sun. We make a translation transform and then apply it to the earth:
 moveXby2=translate(2,0,0);
 movedEarth=moveXby2(earth);

Giving names to transforms, textures and geometric models at every step of composition leads to descriptions that are tedious to read and write. In RBML, naming and composition are completely independent, so the author is free to choose how much and where to introduce names, based on individual style and intended reuse. For example, we can name just the imported sphere and texture and the complete moved earth, as in the following description, which is equivalent to the previous one but does not introduce as many names:

```
sphere = import("sphere.wrl");
earthMap = import("earth-map.gif");
movedEarth =
   apply(translate(2,0,0),
    apply(scale3(0.5),
     texture(earthMap)(
      sphere))));
```

Next we build up a model of the sun. No transformation is required, but we do want it to be yellow:
 sun=diffuseColor(yellow)(sphere);

To complete our first very simple solar system, we simply combine the sun and moved earth into one model:
 solarSystem1=sun union movedEarth;

Scoped Naming

Naming is useful for making descriptions understandable and reusable, but can easily cause clutter. When intermediate animations are named and then used in only one or a few animations (as might be the case of sun and movedEarth above), they can interfere with available choices for intermediate names in other animations. While this clutter is not a problem with very simple animations described and maintained by a single author, it can become a serious obstacle as complexity grows and separately authored animations are combined to work together.

The solution to name clutter is to explicitly limit the scope of a name's definition. In our example, we will leave the sphere, earthMap, and solarSystem1 definition unscoped, but limit the scope of the sun and movedEarth definitions.

```
solarSystem1 =
let
   movedEarth =
    apply(translate(2,0,0),
     apply(scale3(0.5),
      texture(earthMap)(sphere))));
   sun = diffuseColor(yellow)(sphere);
in
   sun union movedEarth;
```

Any other potential uses of the names movedearth and sun would not refer to the scoped definitions above.

Parameterization

It is often desirable to create several animations that are similar but not identical. If such models differ only by transformation (for instance, if they are translations and orientations of a single model), the composition approach is helpful. In general, however, reuse with transform application—which corresponds to the instancing facility commonly found in graphics modeling and programming systems—is a very limited technique.

RBML goes far beyond instancing by providing a simple but extremely general and powerful form of parameterization. Families of related animations can be defined in terms of parameters of any kind, including other animations.

As an example of parameterization, suppose that we want a variety of simple solar systems differing only in the sun color and an angle of rotation of the earth around the sun. Each of these solar systems has its own color and own rotation angle, but in all other ways is identical to its other family members. We define such a family as follows. (Note that sunColor and earthangle are parameter names that refer generically to the color and angle that distinguishes one simple solar system from another.)

solarSystem2(sunColor, earthAngle)=let
 movedEarth=

```
apply(rotate(yAxis, earthAngle),
 apply(translate(2,0,0);
  apply(scale3(0.5),
   texture(earthMap)(sphere)))));
sun = diffuseColor(sunColor)(sphere);
in
   sun union movedEarth;
```

Members of this new solar system family are specified by applying solarSystem2 to various colors and angles.

Behaviors

Up to this point, our examples have described static models, that is, models that do not vary with time. These models were built compositionally, from static numbers, colors, images, transforms, and other models. In RBML, one can just as easily express behaviors, that is, time-varying values of all types, with static values being just degenerate versions of the general case.

The simplest non-static behavior is time—a number-valued behavior that starts out with value zero and increases at a rate of one unit per second. As a simple example of a compositionally defined behavior, the following expression describes a number-valued behavior that starts out with value zero and increases at a rate of 2p per second:

rising=2* pi * time;

We can use this number behavior to describe a time-varying scaling transform that starts as a zero scale and increases in size:

growing=scale3(rising);

And we can use this growing behavior to describe a geometry-valued behavior, that is, a 3-D animation, such as solar system growing from nothing:

growingSolarSystem1=apply(growing, solarsystem1);

As always, intermediate definitions are optional; we could just as well use:

growingSolarSystem1=apply(scale3(2* pi * time), solarSystem1);

With a slight variation, we could have the scale go back and forth between 0 and 2:

pulsating=apply(scale3(1+sin(time)), solarSystem1);

We can also apply our solarSystem2 family, defined above, to behavior arguments to create time-varying solar systems, as in the following example in which the sun color runs through a variety of hues while the earth rotates around the sun.

animatedSolarSystem2=solarSystem2(colorHsl(time, 0.5, 0.5), 2* pi * time)

Behaviors as Data Flow

For some people, it is helpful to visualize behaviors as data flow graphs. For example, the animatedSolarSystem2 behavior above can be illustrated as in the figure below. Note that, unlike traditional data flow, behaviors describe a continuous flow of values, not a discrete sequence.

Data flow diagrams, while somewhat helpful for illustrating simple non-reactive behaviors, are much weaker than what can be expressed in RBML, because of both reactivity and time transformability.

More Parameterization

We would now like to enrich our solar system in two ways: by making the earth revolve around its own axis, as well as rotate about the sun, and by adding a moon that revolves about its axis and rotates around the earth. Parameterization allows us to capture the similarities between moon and earth, while allowing for their differences.

We start with a simple definition that rotates a given model with a given period: rotateWithPeriod(geo, orbitperiod)

apply(rotate(yAxis, 2* pi * time/orbitperiod), geo);

We will use rotateWithPeriod both to create a revolving earth and moon, as well as a building block for the following definition, which puts models into orbit.

orbit(geo, orbitperiod, orbitRadius)=rotateWithPeriod (translate(orbitRadius, 0, 0), geo), orbitperiod)

We can now define our extended solar system.

```
solarSystem3 =
let
    // constants
    sunRadius = 1           // size of the sun
    day = 3                 // seconds per day
    earthRadius    = 0.5 * sunRadius   // size of earth
    earthRotationPeriod = 1 * day
    earthOrbitRadius = 2.0 * sunRadius
    earthOrbitPeriod = 365 * day
    moonRadius     = 0.25 * earthRadius // size of moon
    moonRotationPeriod = 28 * day
    moonOrbitRadius = 1.5 * earthRadius
    moonOrbitPeriod = moonRotationPeriod
    // sun is a yellow sphere
    // earth is a sphere with the earth-map texture
    // moon is a gray sphere
    sun = apply(scale3(sunRadius),
```

-continued

```
        diffuseColor(yellow)(sphere));
    earth = apply(scale3(earthRadius),
        texture(earthMap)(sphere);
    moon = apply(scale3(moonRadius),
        diffuseColor(rbgColor(0.5,0.5,0.5))(sphere))
    // define the relationships between and the motions of the bodies
    moonSystem = rotateWithPeriod(moon, moonRotationPeriod)
    earthSystem =
        RotateWithPeriod(earth, earthRotationPeriod) union
        orbit(moonSystem, moonOrbitPeriod, moonOrbitRadius)
    sunSystem =
        sun union
        orbit(earthSystem, earthPeriod, earthOrbitRadius)
in
    sunSystem
```

Adding Sound

We will now add sound to our solar system example by having the earth emit a "whooshing" sound. The sound will come from the earth, so as a user moves around in the solar system or as the earth moves around, the user will be able to maintain a sense of the spatial relationship, even when the earth is out of sight. Moreover, if the moon is making a sound as well, the user will hear them both sounds appropriately altered and mixed.

All that is necessary to add sound is to change the head to include a spatially translated sound, modifying earth in the solarSystem2 definition as follows:

earth =
      apply(scale3(earthRadius), texture(earthMap)(sphere))
      union
      soundSource3(import("whoosh.au"));

The soundSource3 function used here places a sound at the origin in 3-D space, converting it into a geometric model, which can then be transformed and combined with other geometric models.

We can also make sound attributes vary with time. For example, we can adjust the earth sound's pitch so that it fluctuates during the day, as in the following definition. The formula used with pitch below causes the pitch factor to vary between 0.5 and 1.5 and back through the course of a day.

```
    earth =
        apply(scale3(earthRadius), (earthMap)(sphere)
            union
        soundSource3(
            pitch(sin(2 * pi * time/day)/2 + 1)(
            import("whoosh.au"));
```

Reactivity

In the real world, as well as in computer games, simulations, and other applications of interactive animation, behaviors are influenced by events, and can be modeled as a series of events and reactions (or stimuli and responses). In this paper, we refer to behaviors that react to an event as reactive behaviors.

Simple Reactivity

As a very simple example of a reactive behavior, suppose that we want our solar system's base color to be red at first, but then become green when a user presses the left button on the mouse.

In RBML, this process is expressed as follows:
   twoPhase=red until LBP=>green

Chaining

After the user presses the left button, twoPhase turns from red to green, and stays green permanently; that is, it is no longer reactive. We can also specify a behavior that is still reactive in its second phase. For example, we can have the solar system color change to yellow when the user presses the left button for the second time.

In RBML, this process is expressed as follows:

```
threePhase =
    red until
        LBP => (green until LBP => yellow)
```

Competing Events

In the twoPhase and threePhase examples, each phase was interested in at most one event (LBP or nothing). Often, however, a phase reacts to a number of different events, each leading to a different phase. For instance, we can define a variation of twoPhase so that if our user presses the right button instead of the left, while in the red phase, then the color becomes blue instead of green, where RBP refers to our user's right button press event.

In RBML, this process is expressed as follows:

```
choose =
    red until
        LBP => green
      | RBP => blue
```

Repetition

Now suppose we want a color that switches back and forth between red and green at each button press, no matter how many times a button is pressed. Describing this repetitive behavior by a chain of single-color phases, as with twoPhase and threePhase, requires a infinite chain. Fortunately, this infinite chain has a succinct description.

In RBML, this repetitive behavior is expressed as follows:

```
cyclic =
    red until
        LBP => green until
            LBP => cyclic
```

Hierarchical Reactivity

In the previous three reactive behavior examples, each phase was a simple static color. In general, each phase of a reactive behavior can be an arbitrary behavior, even a reactive one. For example, we may want to present our user with the red/green cyclic behavior above only until the user presses the mouse's right button, at which time the color becomes permanently yellow.

In RBML, this process is expressed as follows:
cyclic until
RBP=>yellow

Parametric Reactivity

Sometimes a reactive behavior goes through a sequence of phases that are similar, but not identical. For instance, a game may need to keep track of a player's score. Supposed we have already defined scored to refer to the event of a player scoring a point. (The subject of how events such as scored can be defined is addressed later.)

Each phase in this score-keeping behavior is similar in that its value is a static number. It is waiting for an occurrence of the scored event, at which time it will switch to a similar phase with one greater value. To define all of these phase behaviors at once, we describe the family parameterized by the only difference among them—the current score:

```
score(current) =
    current until
        scored => score(current+1)
```

The behavior that starts counting from 0 is expressed as follows:
scoreFromZero=score(0)

As always, we can limit the scope of the intermediate definition:

```
scoreFromZero =
    let
        score(current) =
            current until
                scored => score(current+1)
    in
        score(0)
```

This counting behavior goes on forever. We might, however, want to stop counting upon reaching some given maximum. as follows.

```
scoreUpTo(maxScore) =
    let
        score(current) =
            current until
                scored => score(current+1)
              | current = maxScore => current
    in
        score(0)
```

Alternatively, we could define scoreUpTo in terms of the scoreFromZero.

```
scoreUpTo(maxScore) =
    scoreFromZero until
        scoreFromZero=maxScore => maxScore
```

Event Data

Some events have data associated with their occurrences. For instance, each occurrence of a key press event has an associated character value. (It would be unwieldy to have a separate event associated with every key on a keyboard.) As another example of events with data, we can generalize our score-keeping behavior so that each occurrence of the scored event could have its own number of points to be added to the total score. In the new version shown below, the event data generated by the scored event (number of points) is consumed by a parameterized behavior (addpoints below) which adds the number of points to the current score, and continues counting.

```
score(current) =
    let
        addPoints(points)
            score(current+points)
    in
        current until
            scored => addPoints
```

As mentioned in the section "Compositional Specification" above, naming is optional. Even parameterized definitions may be replaced by the parameterized behavior itself, using the construct "function (parameters). expression". The following definition of score is equivalent to the previous one.

```
score(current) =
    current until
        scored => function (points). score(current+points)
``` scored=>function (points). score(current+points)

The Varieties of Events

The preceding section illustrated a variety of ways to use events to describe behaviors in terms of other behaviors-that is, these behaviors are described compositionally. The next few sections examine how to describe the events themselves. In RBML, even events are described compositionally.

External Events

Some events originate outside of RBML; for example, they can originate with a user, such as the left or right mouse button press events in some of our previous reactive examples.

Another example of an external event is a key press. Like a button event, a key press event can occur repetitively, but unlike a button event, key presses have associated data that indicates which character was pressed.

Condition Events

Another kind of event is the becoming true of a condition about model parameters, as illustrated in the scoreUpTo example above:

growing=maxScore

In this context, the equal sign (=) means equality, not definition.

These event conditions may be arbitrary complex. As a slightly more sophisticated example, suppose we want to release a ball and respond to the event that the ball is hitting the floor. We'll define center as the (time-varying) height of the ball's center point, and radius as the ball's radius. We will consider the ball to be hitting the floor when two conditions are true: the bottom of the ball (that is, the center height minus the radius) is not above the floor, and the ball is moving in a downward direction (that is, the rate is less than zero).

In RBML, this event is expressed as follows:

```
hitFloor =
    (center - radius <= floor) and (derivative(center) < 0)
```

Derivatives are discussed later in this document.

Alternative Events

Given any two events, we can describe the event that occurs when either happens. For example, the following describes either a left mouse button being pressed or our ball hitting the floor:

LBP |hitFloor

By repeatedly using the choice operator, |, we can include as many component events as desired in the choice. For example:

LBP|hitFloor|scoreFromZero=maxScore

Events with Handlers

Another way to build events is to introduce or enhance event data. For example, we may want an event that occurs whenever our user presses the left or right mouse button, and has value 1 if the left button is pressed and value 2 if the right button is pressed. First, we describe an event that occurs if the left button is pressed and has value 1:

LBP=>1

Then we describe a similar event based on the right button and having value 2:

RBP=>2

We then combine these two number-valued events into a single event:

buttonScore=LBP=>1|RBP=>2

If an event already produces data, we can supply a way to transform the data into some other, more usable value. For example, we may want an event similar to buttonScore, but with values multiplied by 10. Rather than changing the definition of buttonScore, which may be needed elsewhere or may be out of our control, we make a new event by adding a multiply-by-ten event handler:

```
multiplyByTen(x) = 10 * x
buttonScore10 =
    buttonScore => multiplyByTen
```

We can do the same thing without introducing the multiplyByTen definition:

```
buttonScore10 =
    buttonScore => functin (x). 10 * x
```

As another, simpler example of transforming event data, we may want to take a key press event and change all lowercase letters to uppercase.

keyPress=>capitalize

Differentiation and Integration

Because RBML time is continuous, rather than proceeding in a series of small jumps, it makes sense to talk about the rate of change of behavior of types like number, point, vector, and orientation. For example, suppose that moonCenter is the time-varying position of the center of the moon relative to the earth. The moon's 3-D velocity vector (which is also time-varying) is expressed as follows: derivative (mooncenter)

and the moon's 3-D acceleration vector is expressed as:

derivative(derivative(moonCenter))

Conversely, it is common to know the rate of motion of an object and want to derive the position over time. Given a velocity and an initial position, we could express the position over time as:

initialpos+integral(velocity)

It is often useful to specify the rate of motion of an object in terms of its own position. Suppose we have a goal, which may be moving, and we want to describe a point that starts at some initial position and always moves toward the goal, slowing down as it gets closer to the goal. The following definition describes this sequence:

pos=initialPos+integral(goal-pos)

Many realistic-looking physical effects can be described in this fashion.

Time Transforms

Just as geometric transforms allow for some geometric modularity in model construction, time transforms have an analogous temporal benefit for behaviors of all types.

For example, we have a rocking sailboat expressed as follows:

```
sailBoat1 = apply(rotate(zAxis, sin(time) * pi/6),
    import("sailboat.WRL"))
```

If we want a slower sailboat, we could replace sin(time) with sin(time/4). However, for reusability, we want instead to describe a new sailboat in terms of sailBoat1.

sailBoat2=timeTransform(sailBoat1, time/4)

With this technique, we could define any number of coexisting similar sailboats, each having its own rate of rocking.

User Interaction

RBML animations are intrinsically interactive, meaning that they know how to respond to user interaction events. We have already seen examples of events based on mouse buttons. Another form of input is a key press, which is similar to a button press but includes the generated character as event data.

Geometric user interaction is supported through an event where an animation is being probed. From the animation's viewpoint, the user's probe is a point-valued behavior, which RBML breaks into a static point at the onset of probing and an offset vector behavior to show relative movement. These points and vectors are 2-D for probed images and 3-D for probed geometry.

Because there may be any number of transformed versions of an RBML animation coexisting at any time, there is no unique relationship between an animation and any given coordinate system, such as user coordinates. Thus, animations can only make sense of user input given to them within their own local coordinates. RBML automatically makes the conversion from the user coordinates to the animation's own local coordinates.

For example, the following describes an image moving under user interaction:

```
movingImage(startImage) =
    // Stay with startImage until clicked on.
    startImage until
        andEvent(leftButtonPress, probed(startImage)) =>
        function (), (pickPoint, offset).
        // Then make a version that moves with the offset
        // (given in modeling coords)
        let
            moving = translate(offset)(startImage)
        in
            // Then stay with the moving image until released.
            moving until
            // Then snap-shot the moving image and use it to start over
            snapshot(moving, leftButtonRelease) => movingImage
```

While we have described the invention in detail with reference to specific embodiments, the concepts of the invention can be implemented in a variety of ways without departing from the scope of the invention. For example, RBML models may either be compiled or interpreted. RBML models can be compiled into machine dependent object code or optimized virtual machine code (machine independent object code). Alternatively, RBML models can be interpreted. The operation and structure of the RBML engine can vary without departing from the scope of the invention. A declarative modeling system designed according to the invention can be implemented in a stand-alone computer system, or in a distributed computer environment such as a local area network or on the Internet.

In view of the many possible embodiments to which the principles of our invention may be put, we emphasize that the detailed embodiments described above are illustrative only and should not be taken as limiting the scope of our invention. Rather, we claim as our invention all such embodiments as may come within the scope and spirit of the following claims and equivalents to these claims.

We claim:

1. A computer implemented system for modeling and presenting interactive media comprising:
    a declarative model stored on computer readable medium including a description of media as a continuous function of time, and discrete, user-defined events which alter the presentation of the media;
    a declarative modeling engine operable to read the declarative model and to create a functional data graph representing the model, operable to control the presentation of the media through evaluation of the functional data graph, and operable to monitor the discrete, user-defined events and update the functional data graph in response to the discrete, user-defined events.

2. The computer implemented system of claim 1 wherein the user-defined event is expressed in terms of a user-defined expression in which a second event is a parameter.

3. The computer implemented system of claim 1 wherein the user-defined event is parameter to a second event.

4. The computer implemented system of claim 1 wherein the user-defined event returns a data value when the declarative modeling engine determines that the user-defined event has occurred.

5. The computer implemented system of claim 4 wherein the user-defined event returns a function applied to the data value when the declarative modeling engine determines that the user-defined event has occurred.

6. The computer implemented system of claim 1 wherein the user-defined event is part of an expression that defines a reactive behavior, where the media is expressed as a first continuous function of time until the user-defined event, and the media is expressed as a second continuous function of time in response to the event.

7. The computer implemented system of claim 1 wherein the description of the media includes a time transform that takes a behavior expressing the media as a continuous function of time and produces a new behavior expressing the media as a continuous function of a transformed time, computed by applying the time transform to time values.

8. The computer implemented system of claim 1 wherein the description of the media includes a time transform that takes a behavior expressing the media as a continuous function of time and produces a new behavior expressing the media as a continuous function of a transformed time, computed by applying the time transform the behavior.

9. A computer implemented method for presenting integrated media comprising:
    reading from memory a declarative model of interactive animation including a description of media as a function of time, and a discrete, user defined event which alters the presentation of the media;
    parsing the declarative model to create a functional data graph;
    evaluating the functional data graph to identify a first set of the media that requires rendering;
    monitoring for the discrete, user-defined event;
    in response to detecting the event, modifying the functional data graph;
    evaluating the modified functional data graph to identify a second set of the media that requires rendering; and
    generating rendered media including displaying a sequence of frames of animation on a display device.

10. The computer implemented system of claim 9 wherein the user-defined event is expressed in terms of a user-defined expression in which a second event is a parameter.

11. The computer implemented system of claim 9 wherein the user-defined event is parameter to a second event.

12. The computer implemented system of claim 9 wherein the user-defined event returns a data value associated with the event when the user-defined event is determined to have occurred.

13. The computer implemented system of claim 12 wherein the user-defined event returns a function applied to the data value when the user-defined event is determined to have occurred.

14. The computer implemented system of claim 9 wherein the user-defined event is part of an expression that defines a reactive behavior, where the media is expressed as a first continuous function of time until the user-defined event, and the media is expressed as a second continuous function of time in response to the event.

15. The method of claim 9 including:

analyzing the functional data graph to identify time varying behavior that has not changed between a first and second frame of animation; and caching rendered media in memory that has not changed between the first and second frame and re-using the rendered media to generate output of the media rather than re-rendering the media.

16. In a programmed computer system for presenting integrated media, a method for regulating the presentation of the integrated media comprising:

reading a declarative model including a description of media in terms of continuous, time varying behavior, discrete user-defined events which alter the presentation of the media, and a reactive behavior corresponding to a user defined event and defining a behavior of the media in response to the corresponding user-defined event;

at a first system time, analyzing the declarative model to predict the user-defined event corresponding to the reactive behavior from the discrete events programmed to occur at a second, later system time;

based on the predicted event, performing preparatory actions to achieve low latency playback of the reactive behavior in response to the predicted event.

17. The method of claim 16 wherein the performing step includes:

retrieving a sound file from memory.

18. The method of claim 16 wherein the performing step includes:

retrieving an image or texture file from memory.

19. The method of claim 16 wherein the performing step includes:

retrieving one or more frames of video from memory.

20. The method of claim 16 wherein the performing step includes:

establishing a network connection.

21. A computer readable medium on which is stored a declarative modeling language model for representing interactive animation, said model comprising declarative instructions, which instruct a computer to perform the steps of:

creating a first set of static values from a continuous, time varying expression of behavior in the model;

rendering the first set of static values to generate a first set of frames of animation for display;

monitoring for discrete, user defined events specified in the model;

in response to detecting one of the discrete events, creating a second set of static values; and rendering the second set of static values to generate a second set of frames of animation for display.

22. In a method of transmitting an animated display sequence over a network to a user, and displaying the sequence to the user, an improvement comprising transmitting a textual declarative model defining behavior of an object to be displayed during said sequence over the network, said model including a description of animation as a continuous function of time and at least one user-defined event affecting behavior of the object.

23. In a programmed computer system for presenting integrated media, a method for regulating the presentation of the integrated media comprising:

reading a declarative model including a description of media in terms of continuous, time varying behavior, and discrete events which alter the presentation of the media;

analyzing the declarative model to determine when a first event will occur;

deferring evaluation of the first event to a later system time based on the analyzing step to avoid unnecessary calculation;

evaluating the first event at the later system time; and displaying on a display device media associated with the first event.

24. The method of claim 23 wherein the first event includes an intersection between first and second geometric objects represented in memory of the programmed computer system, and the evaluating of the first event includes determining whether the first and second geometric object intersect.

25. A computer implemented system for modeling and presenting interactive media comprising:

a declarative model stored on computer readable medium including a user-defined description of reactive media as a continuous function of time and as a function of a discrete event that alters the presentation of the media, where the description includes a user-defined expression of the reactive media having a first behavior as a continuous function of time until the discrete event and then a second behavior as a continuous function of time in response to the event;

a declarative modeling engine operable to read the declarative model and to create a functional data graph representing the model, operable to control the presentation of the media through evaluation of the functional data graph, and operable to monitor the discrete events and update the functional data graph in response to the discrete events.

* * * * *

UNITED STATES PATENT AND TRADEMARK OFFICE
CERTIFICATE OF CORRECTION

PATENT NO. : 5,764,241

DATED : June 9, 1998

INVENTOR(S) : Elliott et al.

It is certified that error appears in the above-identified patent and that said Letters Patent is hereby corrected as shown below:

Column 11, line 38, "colorHs 10" should read --colorHsl ( )--.
Column 12, line 46, "leftButtonPress I x< =minx" should read --LeftButtonPress x< =minx--.
Column 13, lines 13-14, "red until LBF" should read --red until LBP--.
Column 13, lines 26-27, "red until LBF" should read --red until LBP--.
Column 15, line 30, " b unitl" should read --b until--.
Column 15, line 58, "time local time" should read --local time--.
Column 16, line 1, "with a behaviors" should read --with a behavior--.
Column 16, line 8, "Time always. increase" should read --Time always increases--

Column 16, line 32, "in Appendices A and B" should read --below--.
Column 17, line 51, "of RBML" should read --of RBML.
Column 18, line 40, "can implemented" should read --can be implemented--.
Column 21, line 11, "render the head the base" should read --render the head--.
Column 24, line 64, "expression," should read --expression₁,--.
Column 25, line 6, "is listed in at the end" should read --is listed at the end--.
Column 25, line 18, "expressions" should read --expression₃--.
Column 26, line 47, "numberg ->" should read --number ->--.
Column 27, line 3, "and y-> string" should read -- and γ->string--.
Column 28, line 6, "infix o: $(\alpha->\beta)*(\alpha->\gamma)->(\alpha->\gamma)$" should read -- infix o: $(\alpha->\beta)*(\beta->\gamma)->(\alpha->\gamma)$--.
Column 28, line 47, "of type a list" should read --of type α list--.
Column 30, line 53, "An a event" should read --An α event--.
Column 31, line 4, "then e->f" should read --then e=>f--.
Column 31, line 10, "an a event" should read --An α event--.

UNITED STATES PATENT AND TRADEMARK OFFICE
CERTIFICATE OF CORRECTION

PATENT NO. : 5,764,241

DATED : June 9, 1998

INVENTOR(S) : Elliott et al.

It is certified that error appears in the above-identified patent and that said Letters Patent is hereby corrected as shown below:

Column 31, line 15, "an a event" should read --An α event--.
Column 31, line 15, "a values" should read --α values--.
Column 31, line 21, "type a behavior" should read --type α behavior--.
Column 32, line 45, "at time to" should read --at time t0--.
Column 32, line 67, "infix |: a event * α event->a event" should read --infix |: α event * α event->α event--.
Column 33, line 8, "a event * (α>β)" should read -- α event * (α->β)--.
Column 33, line 13, "a event" should read --α event--.
Column 33, line 22, "producing" should read --produce--.
Column 33, line 25, "is occurs" should read --occurs--.
Column 41, line 63, "value, 0," should read --value, ( ),--.
Column 42, line 23, "pair This" should read --pair. This--.
Column 50, line 23, "hear them both" should read --hear both--.
Column 51, line 56, "supposed" should read --suppose--.
Column 52, line 22, "maximum. as" should read --maximum, as--.
Column 53, line 7, please remove entire line "scored=>function(points). score(current+points)".

Signed and Sealed this

Nineteenth Day of September, 2000

Attest:

Q. TODD DICKINSON

Attesting Officer

Director of Patents and Trademarks